(12) United States Patent
Sreenivas et al.

(10) Patent No.: US 10,198,581 B2
(45) Date of Patent: Feb. 5, 2019

(54) CONTROLLING ENTERPRISE ACCESS BY MOBILE DEVICES

(75) Inventors: Giridhar Sreenivas, Seattle, WA (US); Derek Sigurdson, Bothell, WA (US); Kurt Berglund, Seattle, WA (US); Jordan Parker, Seattle, WA (US)

(73) Assignee: Rapid7, Inc., Boston, MA (US)

( * ) Notice: Subject to any disclaimer, the term of this patent is extended or adjusted under 35 U.S.C. 154(b) by 34 days.

(21) Appl. No.: 13/414,543

(22) Filed: Mar. 7, 2012

(65) Prior Publication Data

US 2013/0239168 A1    Sep. 12, 2013

(51) Int. Cl.
*H04L 9/00* (2006.01)
*G06F 21/57* (2013.01)
*H04L 29/06* (2006.01)

(52) U.S. Cl.
CPC .......... *G06F 21/577* (2013.01); *G06F 21/57* (2013.01); *H04L 63/102* (2013.01); *H04L 63/1433* (2013.01); *H04L 63/0227* (2013.01)

(58) Field of Classification Search
CPC ........ G06F 21/00; G06F 21/577; G06F 21/57; H04L 63/102; H04L 63/1433
USPC ...................................................... 726/1, 25
See application file for complete search history.

(56) References Cited

U.S. PATENT DOCUMENTS

| | | | |
|---|---|---|---|
| 8,234,705 B1 * | 7/2012 | Roskind et al. | 726/22 |
| 8,483,371 B2 * | 7/2013 | Crandell et al. | 379/142.06 |
| 2005/0283834 A1 * | 12/2005 | Hall | G06F 21/577 |
| | | | 726/24 |
| 2006/0191012 A1 * | 8/2006 | Banzhof et al. | 726/25 |
| 2008/0120699 A1 * | 5/2008 | Spear | 726/4 |
| 2009/0077666 A1 * | 3/2009 | Chen et al. | 726/25 |
| 2010/0057631 A1 * | 3/2010 | Warner | 705/318 |
| 2010/0223670 A1 * | 9/2010 | Castell et al. | 726/24 |
| 2011/0119765 A1 * | 5/2011 | Hering et al. | 726/25 |

OTHER PUBLICATIONS

U.S. Appl. No. 13/414,531, filed Mar. 2012, Sreenivas et al.*
U.S. Appl. No. 13/414,557, filed Mar. 2012, Sigurdson et al.*
U.S. Appl. No. 13/414,565, filed Mar. 2012, Sigurdson et al.*

* cited by examiner

*Primary Examiner* — Beemnet W Dada
(74) *Attorney, Agent, or Firm* — Ashwin Anand

(57) ABSTRACT

A system comprising at least one component running on at least one server and receiving vulnerability data and, for each device of a plurality of devices, device data that includes data of at least one device component. The system includes a trust score corresponding to each device of the plurality of devices and representing a level of security applied to the device. The trust score is generated using a severity of the vulnerability data. The system includes an access control component coupled to the at least one component and controlling access of the plurality of devices to an enterprise using the trust score.

71 Claims, 44 Drawing Sheets

M⊙BILISAFE
Dashboard >

Alerts   Policies
Organization  Devices  Vulnerabilities

Settings  Support  Sign Out
001,254 connections
protected

Giri Sreenivas

Export this view

Contact Details
gsreenivas@mobilisafe.com
206.123.3211

Actions
Quarantine Employee
Block Employee

Affected by 2 policies

- If employee has more than 9 failed access attempts, quarantine employee (all devices).

Create Policy for this Employee

- If employee accesses network for first time, alert Admins.

Add Exception

Employee Devices
3

Last Access
09/25/2011 15:44
Seattle, WA, USA
Device ID: 2993

Access Location Hotspots

1d  3d  1w

Employee Resource Consumption by Application
Sharepoint

SAP

Salesforce

Exchange                                           1-4     5-25    26+

Employee Devices

Unknown Device with Android 3.2 Honeycomb

| Device ID | | Last Access | This device cannot be detected. |
| 2993 | | 09/25/2011 15:44 | The employee can self-identify the |
| | | Seattle, WA, USA | device with a generated link. |
| TrustScore | Vulnerabilities | Update History | Send self-identify link to Giri |
| ? | ? | None | Lock this Device |
| Maker | | Installed Apps | Wipe this Device |
| Unknown | | Unknown | Lock and Wipe this Device |

View Configuration Detail - unavailable

HTC Thunderbolt with Android v3.1 Honeycomb

Device ID
2218

Last Access
09/21/2011 12:01
Seattle, WA, USA

This configuration is out of date.
A newer version of the OS is available: Android v3.2 Honeycomb
Notify Giri TrustScore  Vulnerabilities
8           1

Update History
- 07/11/2011 - Update to Android v3.1 Honeycomb
- 06/20/2010 - Update to Android v3.0 Honeycomb Lock this Device
Wipe this Device Maker
HTC Installed Apps

FIG. 8

M(((•)))BILISAFE     Alerts   Policies                                    Settings   Support   Sign Out Dashboard >       Organization   Devices   Vulnerabilities                     001,254 connections protected

Organization Overview

Employees     Groups                                                                     Export this view

| Group Name | # Employees | Group Average TrustScore | Policies Applied to Group | Exceptions Applied to Group | |
|---|---|---|---|---|---|
| ACTIVE DIRECTORY GROUPS | | | | | |
| Marketing | 23 | 6 | 1 | 0 | |
| Operations | 22 | 5 | 2 | 0 | |
| Finance | 18 | 8 | 0 | 0 | |
| HR | 12 | 7 | 0 | 0 | |
| IT | 7 | 8 | 0 | 3 | |
| Executive | 2 | 8 | 0 | 2 | |
| USER CREATED GROUPS | | | | | Create New Group |
| Ops - Mobile Required | 4 | 8 | 0 | 1 | |
| IT - Super Admin | 2 | 8 | 0 | 5 | |

FIG. 9

M🔊BILISAFE   Alerts   Policies                    Settings  Support  Sign Out
             Organization  Devices  Vulnerabilities    001,254 connections
                                                               protected
Dashboard > Organization Overview >                     Export this view
Ops - Mobile Forbidden Group [⇕]
                                        Add/Remove Employees
                                                        Create Policy
Group Members                       Affected by 1 policy  for this Group
[Search employees]  [Go]
                    Filter data   Export this data   - If Employee is a        Remove Group
                                                       member of Group         from Policy
                                  Lowest           "Ops - Mobile Forbidden"
                                  Device           Then Block Affected
Name        Last access   TrustScore       Devices Sally Sumpkin      09/23/2011 - 09:45     6
Jillian Michaels   09/23/2011 - 09:45     5
Manny Ramirez      09/23/2011 - 09:45     8

Dirk Sigurdson     09/23/2011 - 09:45     8
Maru Stephens      09/23/2011 - 09:45     3
Allison Braun      09/23/2011 - 09:45     8
Matthew Fordham    09/23/2011 - 09:45     9
Jon Ohrt           09/23/2011 - 09:45     8
Jay Dokken         09/23/2011 - 09:45     7

Show
[10 results/page  ⇕] of 12 total

FIG. 10

M📶BILISAFE

Dashboard >
Device Overview

Alerts    Policies
Organization   Devices   Vulnerabilities

Settings   Support   Sign Out
001,254 connections protected

Export this view

| Total Models | Breakdown by Type | | | |
|---|---|---|---|---|
| 35 | | | | Type Breakdown Over Time |
| Active OSs | | | | 1w 1m 1y |
| 6 | Smartphone | 166 \| 90% | | |
| | Tablet | 16 \| 9% | | # |
| Total Configurations | Other/Unknown | 2 \| 1% | | u s e r s |
| 58 | | | | |
| Total Devices | | | | |
| 184 | | ☑ Smartphone | ☑ Tablet | ☐ Other/Unknown |

Active Models   [Search models] [Go]   Filter data   Export this data

| Model (Configuration) | # Employees | Type | TrustScore Range | Status |
|---|---|---|---|---|
| iPhone 4 | 123 | Smartphone | 8-10 | Permitted |
| Android v3.2 Honeycomb | 53 | Smartphone | 8 | Quarantined |
| Android v3.0 Honeycomb | 23 | Smartphone | 7 | Quarantined |
| Android v2.3 Gingerbread | 9 | Smartphone | 4 | Quarantined |
| iPhone 3GS | 52 | Smartphone | 7-9 | Permitted |
| HTC HD7S | 48 | Smartphone | 7-8 | Permitted |
| iPad | 12 | Tablet | 8-9 | Permitted |

Show
[10 results/page ⇕]

Active Operating Systems     Export this data

| Operating System (Version) | # Employees | Total Devices | # Vulnerabilities | TrustScore Range |
|---|---|---|---|---|
| iOS | 123 | 3 | 0 | 7-10 |
| v3.2 Honeycomb | 30 | 3 | 0 | 8-9 |
| v2.3 Gingerbread | 9 | 3 | 4 | 2-4 |
| Windows Phone 7 | 14 | 5 | 2 | 7-9 |
| bada | 3 | 1 | 1 | 4-8 |

FIG. 11

M🎧BILISAFE

Dashboard > Device Overview >
HTC Thunderbolt

| Alerts | Policies | | | Settings | Support | Sign Out |

Organization  Devices  Vulnerabilities 001,254 connections protected

Export this view

| Vulnerabilities | Employees |
|---|---|
| 1 | 114 |

Affected by 2 policies

- If Model has greater than 3 vulnerabilities, quarantine Model.
- If Model is New, alert Admins.

Create Policy for this Model

Add Exception

Excepted from 1 policy

- If Model is Android, quarantine affected devices.

Maker
HTC

Configuration Status
Quarantined

View release notes for this model

Model Capabilities
Password & Lock Screen
Encryption
Lock & Wipe
Other Capability 4

View all capabilities

---

HTC Thunderbolt Configuration Breakdown

| v3.1 Honeycomb | 61 (60%) |
| v3.2 Honeycomb | 29 (25%) |
| v3.0 Honeycomb | 11 (9%) |
| v2.3 Gingerbread | 5 (6%) |

Vulnerabilities (All Active Versions)

1 High Risk    3 Total

Jailbreak (affects v3.1+) - Today 15:30
Lorem ipsum dolor et sumi ipsum et tulio quorum Jailbreak (affects v3.1+) - Today 15:30
Lorem ipsum dolor et sumi ipsum et tulio quorum Jailbreak (affects v3.1+) - Today 15:30
Lorem ipsum dolor et sumi ipsum et tulio quorum

Active OS Configurations

Export this data

| OS Configuration | # Employees | # Vulnerabilities | TrustScore |
|---|---|---|---|
| Android v3.2 Honeycomb | 30 | 0 | 8 |
| Android v3.1 Honeycomb | 53 | 1 | 8 |
| Android v3.0 Honeycomb | 22 | 1 | 7 |
| | | | 4 |
| | 114 | 6 | 6 |

FIG. 12

MOBILISAFE    Alerts    Policies           Settings  Support  Sign Out
              Organization  Devices  Vulnerabilities    001,254 connections
Dashboard > Device Overview > HTC Thunderbolt >                protected

HTC Thunderbolt with Android v3.1 Honeycomb [⇕]          Export this view

This Configuration is out of date.   A newer version of the OS is available: Android v3.2 Honeycomb
                                                        Notify 13 affected employees

|           | Vulnerabilities | Employees |                        | Create Policy for |
|           | 1           | 53    | Affected by 0 policies | this Configuration |

Maker                Configuration Capabilities
HTC                      Password & Lock Screen
Configuration Status Encryption
Quarantined              Lock & Wipe
                         Other Capability 4
View release notes       View all capabilities
for this OS version

Vulnerabilities                                                          Export this data Vulnerability Title   Sed ut perspiciatis unde omnis iste natus error sit voluptatem accusantium doloremque
09/23/2011 - 9:45 AM  laudantium, totam rem aperiam, eaque ipsa quae ab illo veritatis et quasi architecto
                      beatae vitae sunt explicabo.                    View details and take action

Employees    [Search employees]  [Go]    Filter data    Export this data

Name              Last access

Sally Sumpkin         09/23/2011 - 09:45
Jillian Michaels      09/23/2011 - 09:45
Manny Ramirez         09/23/2011 - 09:45

Dirk Sigurdson        09/23/2011 - 09:45
Maru Stephens         09/23/2011 - 09:45
Allison Braun         09/23/2011 - 09:45
Matthew Fordham       09/23/2011 - 09:45
Jon Ohrt              09/23/2011 - 09:45
Jay Dokken            09/23/2011 - 09:45

Show
[10 results/page  ⇕]

FIG. 13

M⟨⟩BILISAFE　　Alerts　Policies　　　　　　　Settings　Support　Sign Out
Dashboard > OS Overview >　Organization　Devices　Vulnerabilities　　001,254 connections protected
Android ⇕　　　　　　　　　　　　　　　　　　　　　　　　　Export this view

|  | | Vulnerabilities | Versions | Affected by 2 policies | Create Policy for this OS Class |
|---|---|---|---|---|---|
|  | | 1 | 4 | • If OS TrustSCore is Medium or Low, quarantine affected devices. | |
|  | Models | Employees | Employee Devices | If OS TrustScore changes, Alert Admins. | Add Exception |
| Developer Google, Inc. | 16 | 53 | 55 | Excepted from 1 policy • If OS TrustSCore is Medium or Low, quarantine affected devices. | |

Android Version Breakdown　　　　　Vulnerabilities (All Active Versions)

| v3.1 Honeycomb | 82 (60%) |
|---|---|
| v3.2 Honeycomb | 40 (25%) |
| v3.0 Honeycomb | 12 (9%) |
| v2.3 Gingerbread | 7 (6%) |

1　High Risk　　3　Total

Jailbreak (affects v3.1+) - Today 15:30
Lorem ipsum dolor et sumi ipsum et tulio quorum Jailbreak (affects v3.1+) - Today 15:30
Lorem ipsum dolor et sumi ipsum et tulio quorum Jailbreak (affects v3.1+) - Today 15:30
Lorem ipsum dolor et sumi ipsum et tulio quorum

Versions　　　　　　　　　　　　　　　　　　　　　　Export this data

| Operating System | # Employees | # Devices | # Vulnerabilities | TrustScore Range |
|---|---|---|---|---|
| v3.2 Honeycomb | 30 | 3 | 0 | 8-9 |
| v3.0 Honeycomb | 22 | 3 | 1 | 6-8 |
| v2.3 Gingerbread | 9 | 3 | 4 | 2-4 |
| | 114 | 35 | 6 | 6 |

FIG. 14

M📶BILISAFE  Alerts  Policies                                    Settings  Support  Sign Out
Dashboard > OS Overview >    Organization  Devices  Vulnerabilities    001,254 connections protected

Android OS v3.1 Honeycomb [⇕]                                    Export this view This newer version of this OS is available
for 11 models: Android 3.2 Honeycomb         Notify 53 affected employees

| | Vulnerabilities | Affected by 2 policies | Create Policy for this OS Class |
| | 1 | • If OS TrustSCore is Medium or Low, quarantine affected devices. | |

| | Models | Employees | If OS TrustScore changes, Alert Admins. Add Exception |
| Developer Google, Inc. | 16 | 53 | Excepted from 1 policy • If OS TrustSCore is Medium or Low, quarantine affected devices. |

View release notes
for this version

Vulnerabilities

Export this data

Vulnerability Title     Sed ut perspiciatis unde omnis iste natus error sit voluptatem accusantium doloremque
09/23/2011 - 9:45 AM    laudantium, totam rem aperiam, eaque ipsa quae ab illo veritatis et quasi architecto
                        beatae vitae sunt explicabo.              View details and take action

Configurations for this OS Version

Export this data

| Model | # Employees | TrustScore | # Vulnerabilities | Type |
|---|---|---|---|---|
| DROID 3 by Motorola | 11 | 8 | 1 | smartphone |
| Samsung Galaxy Tab™ 10.1 3G | 53 | 8 | 1 | smartphone |
| MOTOROLA PHOTON™ 4G | 22 | 7 | 1 | smartphone |
| HTC Status | 11 | 8 | 1 | smartphone |
| HTC EVO 3D | 53 | 8 | 1 | smartphone |
| DROID 3 by MOTOROLA | 22 | 8 | 1 | smartphone |
| Samsung Galaxy Tab™ 10.1 3G | 11 | 8 | 1 | smartphone |
| Nextbook NEXT-2 | 53 | 7 | 1 | tablet |
| MOTOROLA PHOTON™ 4G | 22 | 8 | 1 | smartphone |

M◉BILISAFE

Alerts   Policies                    Settings   Support   Sign Out
Organization   Devices   Vulnerabilities        001,254 connections
                                                        protected
Dashboard >
Vulnerability Overview                              Export this view 42   Vulnerabilities          Vulnerabilities by Risk Level   Vulnerabilities by OS

High    30   affected devices      High      8 (19%)           Android        110 | 60%
                                       Medium    29 (69%)          Windows Phone 7   28 | 15%
Medium  24   affected devices      Low       5 (12%)           Symbian         17 | 9%

Low     36   affected devices                                  bada            15 | 8%
                                                                   webOS           9 | 5%
12  Vulnerabilities                                            Other           3 | 2%
        addressed by updates

*Apply all updates to reduce*        Vulnerabilities by Type   # Vulnerabilities Over Time   1w 3m 1y
*vulnerabilities to 30 and*
raise your average TrustScore to 8!

Application    8 (19%)
                                           OS      29 (69%)
                                     Configuration  5 (12%)

Active Vulnerabilities          [Search vulnerablilities] [Go]   Filter data   Export this view

|                      |            |                              | Update      | # Devices | # of Employees | Devices affected |
| Name                 | Risk Level | Type                         | Date Available? | At Risk | At Risk        | by Policies      |
|----------------------|------------|------------------------------|-------------|---------|----------------|------------------|
| Backdoor.WinCE, . Brador | High   | OS: Windows Phone 7          | 09/25/2011  | 0       | 22             | 20               |
| Worm.SymbOS, .Cabir  | High       | OS: Symbian                  | 09/25/2011  | 0       | 15             | 15               |
| v3.1 Honeycomb bug   | Medium     | OS: Android v2.1-3.1         | 09/23/2011  | 63      | 103            | 25               |
|                      |            |                              |             |         |                |                  |
| Backdoor.WinCE, . Brador | High   | App: Salesforce              | 09/22/2011  | 0       | 22             | 22               |
| Worm.SymbOS, .Cabir  | High       | App: Salesforce              | 09/15/2011  | 0       | 15             | 15               |
| v3.1 Honeycomb bug   | Medium     | Config: Thunderbolt/Android  | 09/13/2011  | 84      | 67             | 0                |
| Backdoor.WinCE, . Brador | High   | App: Salesforce              | 09/03/2011  | 0       | 22             | 20               |
| Worm.SymbOS, .Cabir  | High       | App: Salesforce              | 08/25/2011  | 0       | 15             | 15               |
| v3.1 Honeycomb bug   | Medium     | Config: Thunderbolt/Android  | 08/22/2011  | 23      | 67             | 67               |

Show
[10 results/page ]   of 52 total    FIG. 16

M⊙BILISAFE

Alerts    Policies        Settings   Support   Sign Out
Organization   Devices   Vulnerabilities     001,254 connections protected Dashboard > Vulnerability Overview >

Troj/Mdrop-DKE

Export this view

| OS Affected | Models At Risk | Employees At Risk | Devices At Risk | Affected by 1 policy | |
|---|---|---|---|---|---|
| 1 | 14 | 53 | 59 | - If Vulnerability Threat Level is High, block Affected Devices, AND alert Admins. | Create Policy for this Vulnerability  Add Exception |

Description:
Troj/Mdrop-DKE isSed ut perspiciatis unde omnis iste natus error sit voluptatem accusantium doloremque laudantium, totam rem aperiam, eaque ipsa quae ab illo inventorse veritatis et quasi architecto beatae vitae sunt explicabo.

View Security Notes for this Vulnerability

Vulnerability Threat Level    HIGH     Date first reported: 11 Apr 2011 22:50:24 (GMT)

Change threat level for my org

Recommended actions:
Notify at-risk employees of threat
Notify admins when fix is available
Quarantine All At Risk Devices
Block All At Risk Devices Android OS v3.1
16 Apr 2011 22:50:24 (GMT)

Export this data

At Risk Models

☑ Act on Multiple

| Model | TrustScore Range | #Devices | #Employees | Action |
|---|---|---|---|---|
| DROID 3 by Motorola | 8-9 | 8 | 1 | ☐ |
| Samsung Galaxy Tab™ 10.1 3G | 8 | 8 | 3 | ☐ |
| MOTOROLA PHOTON™ 4G | 5-7 | 7 | 8 | ☐ |
| | | | | ☐ |
| HTC Status | 5-8 | 8 | 1 | ☐ |

Export this data

At Risk Employees

| Name | Last access |
|---|---|
| Sally Sumpkin | 09/23/2011 - 09:45 |
| Jillian Michaels | 09/23/2011 - 09:45 |
| Manny Ramirez | 09/23/2011 - 09:45 |
| Dirk Sigurdson | 09/23/2011 - 09:45 |
| Maru Stephens | 09/23/2011 - 09:45 |
| Alison Braun | 09/23/2011 - 09:45 |
| Matthew Fordham | 09/23/2011 - 09:45 |
| Jon Ohrt | 09/23/2011 - 09:45 |
| Jay Dokken | 09/23/2011 - 09:45 |

Show
[ 10 results/page ⇕ ]

FIG. 17

M(ɑ̃l)BILISAFE

Settings  Support  Sign Out
001,254 connections protected

| Alerts | Policies | | |
|---|---|---|---|
| Organization | Devices | Vulnerabilities | |

Export this view

Alerts

Model Alert: AT&T Samsung. Galaxy S II - Today 15:30
- Major security vulnerability dropping TrustScore below risk threshold
- 23 employees are affected

Recommended:
Quarantine this Model

Security Recommendations:

Block all models with iOS prior to v2        Dismiss
Lorem ipsum dolor et sumi ipsum et           Pin it
Lorem ipsum dolor et sumi ipsum et           Share it
Alert employees to Android update
Tulio quorum balloon hipster animals
Tulio quorum balloon hipster animals
Quarantine Android v2.1

System Alert - Today 15:30
- New TrustFilter available, please upgrade
- Update fixes minor bugs

Recommended:
Update to Mobilisafe v2

Tulio quorum balloon hipster animals
Tulio quorum balloon hipster animals
Block all models with iOS prior to v2

OS Update Alert: Android v5.2 Honeycomb - Today 15:30
- Update available to 4.3.3 for 2 models
- 153 employees using 154 Devices are affected

Recommended:
Notify affected employees

Dismiss
Pin it
Share it

Lorem ipsum dolor et sumi ipsum et
Lorem ipsum dolor et sumi ipsum et
Alert employees to Android update User Alert: John Doe - Today 15:30
- Unusual geographical access from China for John Doe

Recommended:
Quarantine this user

Tulio quorum balloon hipster animals
Lorem ipsum dolor et sumi ipsum et
Quarantine Android v2.1

Remediation Alert - Today 15:30
- 4 models were quarantined impacting 10 employees as a result of a vulnerability

Recommended:
No action required

Tulio quorum balloon hipster animals
Lorem ipsum dolor et sumi ipsum et

Show [ 5 results/page ⇳ ]

☐ Show Dismissed Alerts

FIG. 18

MOBILISAFE

Alerts >

Alerts Policies
Organization  Devices  Vulnerabilities

Settings  Support  Sign Out
001,254 connections protected

OS Update: Android OS 3.2 Honeycomb

Export this view

Alert Recommendation
All affected employees should upgrade immediately.
Notify affected employees of update

Date/Time:
09/27/2011 15:30

What it means for OrgName

| Effect on OS TrustScore | Total Employees Affected | Models Affected |
|---|---|---|
| 1 | 153 | 23 |

Other actions:
Quarantine all devices with older versions
Quarantine all devices with this version
Block all devices with this version
Create new policy for this OS Dismiss Pin it Share it Details Lorem ipsum dolor et sumi ipsum et tulio quorum quora baloon hipster animals quora baloon hipster animals lorem ipsum dolor et sumi ipsum et tulio quorum quora porem ipsum dolor et sumi.
Lorem ipsum dolor et sumi ipsum et tulio quorum quora baloon hipster animals quora baloon hipster animals lorem ipsum dolor et sumi ipsum et tulio quorum quora porem ipsum dolor et sumi ipsum et.

Lorem ipsum dolor et sumi ipsum et tulio quorum quora baloon hipster animals quora baloon hipster animals lorem ipsum dolor et sumi ipsum et tulio quorum quora porem ipsum dolor et sumi ipsum et.
Lorem ipsum dolor et sumi ipsum et tulio quorum quora baloon hipster animals quora baloon hipster animals lorem ipsum dolor et sumi ipsum et tulio quorum quora.

FIG. 19

M⊙BILISAFE

Alerts Policies      Settings   Support   Sign Out
Organization   Devices   Vulnerabilities     001,254 connections protected

Policies

Export this view

TrustScore Thresholds    Edit

| | | Affected Devices | Active Policies | Active Exceptions |
|---|---|---|---|---|
| High | 7-10 | 175 | 2 | 0 |
| Medium | 5-6 | 56 | 44 | 32 |
| Low | 1-4 | 12 | 12 | 23 |

View all Exceptions

Active Policies      Filter policies    Suggested Policies   Create New Policy

| Policy Statement | Date Created | Created by | Trigger Count | Exceptions | Devices Affected |
|---|---|---|---|---|---|
| IF: Configuration TrustScore is Low OR Model TrustScore is Low THEN: Block Affected Devices AND Alert Admins | 12/14/2010 | Joe Eyeteeman | 56 | 3 | 43 |
| IF: Vulnerability Risk Level is High THEN: Quarantine Affected Devices AND Alert Admins AND Alert Affected Employees | 03/25/2011 | Joe Eyeteeman | 56 | 3 | 43 |
| IF: Configuration TrustScore is Low OR Model TrustScore is Low THEN: Block Affected Devices AND Alert Admins | 03/25/2011 | Joe Eyeteeman | 56 | 3 | 43 |
| IF: Employee is a member of Group "Ops - Mobile Forbidden" THEN: Block Affected Devices | 03/25/2011 | Joe Eyeteeman | 15 | 0 | 12 |
| IF: Vulnerability Risk Level is High THEN: Quarantine Affected Devices AND Alert Admins AND Alert Affected Employees | 06/01/2011 | Lynda Weinmann | 56 | 3 | 43 |
| IF: Vulnerability Risk Level is Medium AND # Affected Employees is greater than 25 THEN: Alert Admins | 06/01/2011 | Lynda Weinmann | 56 | 3 | 43 |
| Block all attachment downloads on mobile network. | 06/01/2011 | Lynda Weinmann | 235 | 2 | 243 |
| Block unknown employees from accessing mobile network AND Alert Admins | 06/01/2011 | Lynda Weinmann | 235 | 2 | 243 |

FIG. 20

M(ᴍ)BILISAFE  Alerts Policies  Settings  Support  Sign Out
Organization  Devices  Vulnerabilities  001,254 connections protected Policies >
Policy Detail  Edit This Policy

| Policy Statement | Date Created | Created by | Trigger Count | Exceptions | Devices Affected |
|---|---|---|---|---|---|
| IF: Employee is a member of Group: | 12/14/2010 | Joe Eyeteeman | 15 | 0 | 12 |
| THEN: Block Affected Devices | | | | | |

Employees Affected  Filter this list

| Name | # Affected Devices |
|---|---|
| Sally Sumpkin | 1 |
| Jillian Michaels | 1 |
| Manny Ramirez | 1 |
| | |
| Dirk Sigurdson | 2 |
| Maru Stephens | 1 |
| Alison Braun | 1 |
| Matthew Fordham | 1 |
| Jon Ohrt | 1 |
| Jay Dokken | 1 |

Show

[ 10 results/page  ⇕ ]  of 12 total

FIG. 21

MOBILISAFE    Alerts    Policies                          Settings   Support   Sign Out
              Organization  Devices  Vulnerabilities              001,254 connections
                                                                          protected

Settings
    Application   Application        Refresh Data   Upgrade to Pro and get
                                                        automated refreshes!   Add New Application
    Network
    Admins
                                                        Usage
    My Profile    Exchange    Status   IIS          (past 30 days)
                  Local Server             SERVERNAME   6.5 GB           Edit
    Account
                                           SERVERNAME   6.5 GB Setup new IIS

Usage
                  SAP         Status   IIS          (past 30 days)
                  Private Cloud

Salesforce
                  SaaS

FIG. 22

M⦿BILISAFE  Alerts  Policies          Settings  Support  Sign Out
                Organization  Devices  Vulnerabilities     001,254 connections
                                                                   protected

Settings

Application      Active Directory              Network Information          Edit Network
                 Last sync: 11/04/2011 10:49 PST   Time Zone
Admins           Employees   Groups        US Pacific (PST - Los Angeles, Tijuana)

My Profile       643         9             Localization
                                                   English
Account                  Sync Now

ActiveSync

Last upload: 11/04/2011 13:42 PST

```
-- Enabled Policies --
Yes Policy 1
Yes Policy 2
Yes Policy 3
Yes Policy 4
Yes Policy 5
Yes Policy 8
Yes Policy 11
-- Disabled Policies --
No Policy 7
```

Upload New Data

FIG. 23

| | Alerts  Policies | | Settings  Support  Sign Out |
|---|---|---|---|
| M☉BILISAFE | Organization  Devices  Vulnerabilities | | 001,254 connections protected |

Settings

- Application
- Network
- Admins
- My Profile
- Account

Account

Company Profile   Edit

Company Name
Mobilisafe Inc.

Contact Address
155 108th Ave NE #400
Bellevue, WA 98104

Company Size     Industry
1-50                 Mobile Security

Domain           Compliance
Lorem ipsum          HIPPA, SOx

**Concerns/Plans
/Requirements**
Lorem ipsum

Upgrade Your Account

Small Shop | $XX/mo        CURRENT PLAN
Includes data monitoring for:
- Exchange

Pro | $XX/mo               Upgrade Now
Includes data monitoring for:
- Exchange
- Salesforce

Premium | $XX/mo           Upgrade Now
Includes data monitoring for:
- Exchange
- Salesforce
- SAP
- Others

Billing Info

Payment History

Bill to:  Visa             Edit
              ----------5333

Billing Address:           Edit
Mobilisafe Inc.
155 108th Ave NE #400
Bellevue, WA 98104

FIG. 26

Alerts   Policies                    Settings   Support   Sign Out

MOBILISAFE    Organization  Devices  Vulnerabilities     001,254 connections protected

Security Recommendation

Block all devices running iOS prior to v2

Suggested Policy:

IF:  Device OS is iOS
         AND Version is less than v2
    THEN: Block Affected Devices Date/Time:
09/27/2011 15:30

Other actions:
Quarantine recommended OS version
Create new policy for this OS version Edit policy before adding   Add policy as shown     Dismiss
                                                                                          Pin it
                                                                                          Share it

Why?

All configurations with iOS v2 and less have TrustScores of 4 or less, making your organization more susceptible. These configurations also lower your organization's overall Average TrustScore.

Effects of Taking Action

| Effect on Average TrustScore | Total Employees Affected | Models Affected |
|---|---|---|
| 1 | 5 | 2 |

Details

Sed ut perspicaiatis unde omnis iste natus error sit voluptatem accusantium doloremque laudantium error sit voluptatem accusantium doloremque laudantium, totam rem aperiam totam rem aperiam, Sed ut perspicaiatis unde omnis iste natus error sit voluptatem accusantium doloremque laudantium error sit voluptatem accusantium doloremque laudantium, totam rem aperiam totam rem aperiam, Sed ut perspicaiatis unde omnis iste natus error sit voluptatem accusantium doloremque laudantium error sit voluptatem accusantium doloremque laudantium, totam rem aperiam totam rem aperiam, Sed ut perspicaiatis unde omnis iste natus error sit voluptatem accusantium doloremque laudantium error sit voluptatem accusantium doloremque laudantium, totam rem aperiam totam rem aperiam,

FIG. 27

FIG. 28

M📶BILISAFE   Alerts   Policies                    Settings  Support  Sign Out
           Organization  Devices  Vulnerabilities           001,254 connections
                                                                    protected

Support

This area would give the user the ability file a new support ticket,
as well as see a list of open and past support tickets with
responses from Mobilisafe support team.

If needed, this would also be the area for FAQ/Help
documentation (or would that live on the Marketing Site, with just
a link to it from the app?)

Details TBD.

FIG. 29

View your Mobilisafe Dashboard in a browser >>

MOBILISAFE
2,123,895 connections protected

Apptio Daily Digest
November 22, 2011

Organization Snapshot

| NEW ALERTS | AVG. TRUSTSCORE | TOTAL DEVICES | DATA USAGE |
|---|---|---|---|
| 14 | 9 ⇧ | 408 ⇧ | 380 GB ⇧ |

New Alerts — View all alerts

- ○ Model Alert: AT&T Samsung Galaxy S II  Nov 22, 10:51
  Sed ut perspicaiatis unde omnis iste natus error sit voluptatem...
- △ Alert employees to Android Update  Nov 22, 9:22
  Sed ut perspicaiatis unde omnis iste natus error sit voluptatem...
- △ Quarantine Android v2.1  Nov 22, 5:55
  Sed ut perspicaiatis unde omnis iste natus error sit voluptatem...
- ○ Alert employees to Android update  Nov 21, 22:51
  Sed ut perspicaiatis unde omnis iste natus error sit voluptatem...
- ○ Quarantine Android 2.1  Nov 21, 23:30
  Sed ut perspicaiatis unde omnis iste natus error sit voluptatem...

Risk Tracker

| VULNERABILITIES | 12 ⇧ | HIGH RISK 3 | MEDIUM RISK 6 ⇧ | LOW RISK 3 ⇧ |
|---|---|---|---|---|
| DEVICES ELIGIBLE FOR OS UPDATES | 71 ⇩ | IOS 24 | ANDROID 12 | OTHER 35 ⇩ |
| NEW MODELS | 23 | HIGH RISK 7 | MEDIUM RISK 4 | LOW RISK 12 |

Risk Distribution — View all 6 OS

| ANDROID | 203 ⇧ | HIGH RISK 42 | MEDIUM RISK 103 ⇧ | LOW RISK 58 ⇧ |
|---|---|---|---|---|
| IOS | 162 ⇩ | HIGH RISK 0 | MEDIUM RISK 0 | LOW RISK 162 ⇩ |
| WINDOWS PHONE 7 | 23 | HIGH RISK 7 | MEDIUM RISK 4 | LOW RISK 12 |

MOBILISAFE — change your email settings

FIG. 30

| M◉BILISAFE | ▭ DASHBOARD | ⚇ ORGANIZATION | ▯ DEVICES | ⊞ VULNERABILITIES |
|---|---|---|---|---|
| 2,123,895 connections protected | △ ALERTS ⌂ POLICIES | Giri Sreenivas, Apptio | SETTINGS | SUPPORT | SIGN OUT |

DASHBOARD >

| ORGANIZATION | EMPLOYEES | GROUPS | + ADD WIDGET | ⟲ EXPORT THIS VIEW |
|---|---|---|---|---|

ORGANIZATION OVERVIEW

| TOTAL EMPLOYEES AT ORGANIZATION | EMPLOYEES ON MOBILE NETWORK | TOTAL DEVICES | EMPLOYEE GROUPS | EMPLOYEE-NO ACCESS IN 30+ DAYS | TOTA DATA USAGE (30 DAYS) |
|---|---|---|---|---|---|
| 643 | 298 | 320 | 9 | 31 | 820 GB |

TOTAL DATA USAGE OVER TIME   1w 1m 1y

Data Usage: 100 GB
Dec 17, 2011

◁ OCT 1  OCT 15  NOV 1  NOV 15  DEC 1  DEC 15  JAN 1 ▷

DATA USAGE   1w 3d 1w

TOTAL   380 GB

BY APP
Exchange ▭ 250 GB
SAP ▭ 90 GB
Salesforce ▭ 30 GB
Oracle ▭ 10 GB

BY Group   View all 9 Groups
IT ▭ 240
HR ▭ 80
Marketing ▭ 80

EMPLOYEES ON MOBILE NETWORK

Search Employees...   ⟲ EXPORT DATA

| All | Risky | New | Dormant | Need OS Update | Uknown Device | High Failed Attempts | Suspicious Access |

| NAME | GROUPS | LAST ACCESS ▽ | LOWEST DEVICE TRUSTSCORE | RECENT FAILED ACCESS ATTEMPTS | DATA USAGE LAST 30 DAYS |
|---|---|---|---|---|---|
| Sally Sumpkin | IT | 09/23/2011 09:45 | 6 | 0 | 5.2 GB |
| Jillian Michaels | Executive, Finance | 09/23/2011 09:45 | 5 | 0 | 1.3 GB |
| Manny Ramirez | | 09/23/2011 09:45 | 8 | 0 | 62 GB |
| Giri Sreenivas | | 09/23/2011 09:40 | 7 | 2 | 72 GB |
| Dirk Sigurdson | Executive, Operations | 09/23/2011 09:29 | 8 | 10 | 3.5 GB |
| Maru Stephens | Executive | 09/23/2011 09:26 | 3 | 0 | 182 GB |
| Alison Braun | | 09/23/2011 09:25 | 9 | 0 | 5.0 GB |
| Matthew Fordham | | 09/23/2011 09:22 | 9 | 0 | 5.2 GB |
| Jon Ohrt | Operations, Ops-Mobile Req.. | 09/23/2011 09:16 | 8 | 0 | 250 GB |
| Jay Dokken | | 09/23/2011 09:14 | 7 | 1 | 23 GB |

Show [10 ▽] results per page of 252 total    1 2 3 4 5... 26  ◁ ▷

| | HTC Thunderbolt with Android v3.1 Honeycomb | | ⚠ This configuration is out of date. |
|---|---|---|---|

HTC Thunderbolt with Android v3.1 Honeycomb
DEVICE ID:
2218AB5432H-4451954TYXZ42Z27453ZZ-20001Z ⚠ This configuration is out of date.
A new version of the OS is available for this device.

Notify employee of OS update

| TRUSTSCORE | DEVICE STATUS | LAST ACCESS | |
|---|---|---|---|
| 6 | ⊘ BLOCKED | 09/21/2011 12:01 Seattle, WA, USA | Lock this Device Wipe this Device Lock and Wipe this Device |
| | VULNERABILITIES 1 ALERTS | UPDATE HISTORY 07/11/2011 Update to Android v3.1 Honeycomb | |

CONFIGURATION CAPABILITIES
○ Password & Lock Screen
● Encryption
○ Lock & Wipe
○ Other Capability 4
View All Capabilities 06/20/2010
Update to Android v3.0
Honeycomb INSTALLED APPS
Saleforce
Exchange

--- iPad 2 with iOS 5.01
DEVICE ID:
APL218AB5432H123456

Lock this Device
Wipe this Device
Lock and Wipe this Device

| TRUSTSCORE | DEVICE STATUS | LAST ACCESS |
|---|---|---|
| 9 | ✓ PERMITTED | 09/21/2011 12:01 Seattle, WA, USA |
| | VULNERABILITIES 0 | UPDATE HISTORY 09/09/2011 Update to iOS 4.2.3 |

CONFIGURATION CAPABILITIES
○ Password & Lock Screen
○ Encryption
○ Lock & Wipe
○ Other Capability 4
View All Capabilities INSTALLED APPS
Exchange

---

FAILED ACCESS ATTEMPTS

Search... 🔍        ▽ FILTER DATA   ⌕ EXPORT DATA

| TIME STAMP △ | FAILURE REASON | APPLICATION | DEVICE USED | LOCATION |
|---|---|---|---|---|
| 09/23/11 12:52 | Blocked | Salesforce | iPad 2 | Seattle, WA, USA |
| 09/23/11 12:52 | Blocked | Salesforce | iPad 2 | Seattle, WA, USA |
| 09/23/11 12:53 | Blocked | Salesforce | iPad 2 | Seattle, WA, USA |
| 09/23/11 12:53 | Blocked | Salesforce | iPad 2 | Seattle, WA, USA |
| 09/23/11 12:54 | Blocked | Salesforce | iPad 2 | Seattle, WA, USA |
| 09/23/11 12:57 | Credentials | Exchange | Thunderbolt | Seattle, WA, USA |

Show [10 ▽] results per page of 50 total          1 2 3 4 5  ◁ ▷

FIG. 32B

| | | | |
|---|---|---|---|
| ▷ iPhone 3GS | 52 | 7-9 | -- |
| ▷ HTC HD7S | 48 | 7-8 | -- |
| ▷ myTouch 3G | 47 | 6-9 | -- |
| ▷ Sensation 4G | 47 | 9-10 | -- |
| ▷ iPhone 3GS | 38 | 7-9 | -- |
| ▷ iPad 2 | 12 | 8-9 | -- |
| ▷ Kindle Fire | 3 | 8 | -- |
| ▷ Nextbook NEXT-2 | 2 | 2-4 | -- |

Show [10 ▽] results per page of 48 total         1 2 3 4 5... 12  [◁|▷]

| ACTIVE OPERATING SYSTEMS | | | | ⊙ |
|---|---|---|---|---|
| Search OS... [🔍] | | ▽ FILTER DATA | ⟲ EXPORT DATA | |
| OPERATING SYSTEM (VERSION) | DEVICES ▽ | EMPLOYEES | VULNERABILITIES | TRUSTSCORE RANGE |
| ▷ iOS | 123 | 116 | 0 | 8-10 |
| ▷ Android | 114 | 99 | 6 | 4-8 |
| ▷ Windows Phone 7 | 52 | 52 | 2 | 7-9 |
| ▷ Symbian | 48 | 48 | 2 | 7-8 |
| ▷ bada | 47 | 47 | 1 | 6-9 |
| ▷ webOS | 47 | 47 | 7 | 9-10 |

FIG. 33B

| MOBILISAFE | DASHBOARD | ORGANIZATION | DEVICES | VULNERABILITIES |
|---|---|---|---|---|
| 2,123,895 connections protected | ALERTS  POLICIES | Giri Sreenivas, Apptio | SETTINGS | SUPPORT | SIGN OUT |

DASHBOARD >

VULNERABILITIES                                    + ADD WIDGET    EXPORT THIS VIEW

VULNERABILITIES OVERVIEW

| ACTIVE VULNERABILITIES | DEVICES AFFECTED | BREAKDOWN BY RISK LEVEL | |
|---|---|---|---|
| 42 | 90 | High | 30 devices |
| | | Medium | 24 devices |
| | | Low | 36 devices |

VULNERABILITIES ADDRESSED BY UPDATES

UPDATES AVAILABLE

12    [Notify employees of updates]

RESULTS

Reduce Vulnerabilities: 42 ⇨ 30

Increase TrustScore: 7 ⇨ 8

VULNERABILITIES OVER TIME  1w 1m 1y

High Risk: 12
Dec 9, 2011

OCT 1  OCT 15  NOV 1  NOV 15  DEC 1  DEC 15  JAN 1

ACTIVE VULNERABILITIES

Search Vulnerabilities...            FILTER DATA    EXPORT DATA

| NAME | GROUPS | LAST ACCESS ▽ | LOWEST DEVICE TRUSTSCORE | RECENT FAILED ACCESS ATTEMPTS | DATA USAGE LAST 30 DAYS |
|---|---|---|---|---|---|
| Sally Sumpkin | IT | 09/23/2011 09:45 | 6 | 0 | 5.2 GB |
| Jillian Michaels | Executive, Finance | 09/23/2011 09:43 | 5 | 0 | 1.3 GB |
| Manny Ramirez | | 09/23/2011 09:43 | 8 | 0 | 62 MB |
| Giri Sreenivas | | 09/23/2011 09:40 | 7 | 2 | 72 MB |
| Dirk Sigurdson | Executive, Operations | 09/23/2011 09:29 | 8 | 10 | 3.5 GB |
| Maru Stephens | Executive | 09/23/2011 09:26 | 3 | 0 | 182 MB |
| Alison Braun | | 09/23/2011 09:25 | 9 | 0 | 5.0 MB |
| Mathew Fordham | | 09/23/2011 09:22 | 9 | 0 | 6.3 MB |
| Jon Ohrt | Operations, Ops-Mobile Required | 09/23/2011 09:16 | 8 | 0 | 259 MB |
| Jay Dokken | | 09/23/2011 09:14 | 7 | 1 | 23MB |

Show [10 ▽] results per page of 252 total                1 2 3 4 5... 26  ◁ ▷

FIG. 34

| M🌀BILISAFE | 📶 DASHBOARD | 👥 ORGANIZATION | 📱 DEVICES | ⊞ VULNERABILITIES |
|---|---|---|---|---|
| 2,123,895 connections protected | ☐ ALERTS 🔒 POLICIES | Giri Sreenivas, Apptio | | SETTINGS \| SUPPORT \| SIGN OUT |

ALERTS        ⌕ EXPORT THIS VIEW

ALL ALERTS

Search Alerts... 🔍    Sorty by: [Severity ▼]    ▽ FILTER ALERTS ✕ DISMISS ALL ALERTS

| TYPE | ALERT | RECOMMENDED ACTION | |
|---|---|---|---|
| 📱 | AT&T Samsung Galaxy S II - Today 15:30<br>- Major vulnerability dropping trustscore to low risk threshold<br>- 23 employees affected | Quarantine this model | ✕ DISMISS<br>⤳ SHARE<br>📌 PIN |
| ⚙ | Mobilisafe Update - Today 14:30<br>- New Trustfilter available, please upgrade<br>- Update fixes minor bugs | Update to Mobilisafe v2 | ✕ DISMISS<br>⤳ SHARE<br>📌 PIN |
| ⇧ | Android v3.2 Honeycomb Update -<br>Yesterday 22:10 🛡<br>- Available for 2 models<br>- Affects 153 employeess using 154 devices | Notify affected employees | ✕ DISMISS<br>⤳ SHARE<br>📌 PIN |
| 👤 | Unusual access for John Doe - 12/01/2011 - 15:30<br>- A typical access from China | Quarantine this user | ✕ DISMISS<br>⤳ SHARE<br>📌 PIN |
| 🔒 | Quarantine of 4 models - 12/02/2011 09:30<br>- Causes Vulnerability<br>- Affected 24 devices | -- | ✕ DISMISS<br>⤳ SHARE<br>📌 PIN |

Show [5 ▼] results per page of 14 total      1 2 3 [◁|▷]

FIG. 36

| M🛡BILISAFE | ▫▫▫ DASHBOARD | ஃ ORGANIZATION | ▫ DEVICES | ⊞ VULNERABILITIES |
|---|---|---|---|---|
| 2,123,895 connections protected | ☐ ALERTS 🗐 POLICIES | Giri Sreenivas, Apptio | | SETTINGS \| SUPPORT \| SIGN OUT |

ALERTS >
ALERT DETAIL ⚲ PIN ⤴SHARE ✕ DISMISS

ANDROID V3.2 HONEYCOMB UPDATE ⇑

WHAT IT MEANS FOR APPTIO

| EFFECT ON OS TRUSTSCORE | DEVICES AFFECTED | MODELS AFFECTED |
|---|---|---|
| 7 ◇ ⬢8 | 153 | 23 |

RECOMMENDED ACTION
All affected employees should upgrade immediately.
Notify affected employees MORE ACTIONS
Quarantine all devices with older versions
Quarantine all devices with this version
Block all devices with this version
Create new policy for this OS

DETAILS
YESTERDAY 22:10

Lorem ipsum dolor et sumi ipsum et tulio quorum quora baloon hipster animals quora baloon hipster animals lorem ipsum dolor et sumi ipsum et tulio quorum quora porem ipsum dolor et sumi. Lorem ipsum dolor et sumi ipsum et tulio quorum quora baloon hipster animals quora baloon hipster animals lorem ipsum dolor et sumi ipsum et tulio quorum quora porem ipsum dolor et sumi ipsum et.

Lorem ipsum dolor et sumi ipsum et tulio quorum quora baloon hipster animals quora baloon hipster animals lorem ipsum dolor et sumi ipsum et tulio quorum quora porem ipsum dolor et sumi ipsum et. Lorem ipsum dolor et sumi ipsum et tulio quorum quora baloon hipster animals quora baloon hipster animals lorem ipsum dolor et sumi ipsum et tulio quorum quora.

FIG. 37

View this alert in a browser >>

| ALERT |  |
|---|---|
| OS Update: Android v3.2 Honeycomb | November 22, 2011 |

| Recommended Action | More Actions |
|---|---|
| All affected employees should upgrade immediately.<br><br>Notify affected employees | Quarantine all devices with older versions<br>Quarantine all devices with this version<br>Blocak all devices with this version<br>Create new policy for this OS |

What it means for Apptio

| EFFECT ON OS TRUSTSCORE | DEVICES AFFECTED | MODELS AFFECTED |
|---|---|---|
| 1 ⇧ | 153 | 23 |

Details

DATE/TIME: Yesterday 22:10

Lorem ipsum dolor et sumi ipsum et tulio quorum quora baloon hipster animals quora baloon hipster animals lorem ipsum dolor et sumi ipsum et tulio quorum quora porem ipsum dolor et sumi.
Lorem ipsum dolor et sumi ipsum et tulio quorum quora baloon hipster animals quora baloon hipster animals lorem ipsum dolor et sumi ipsum et tulio quorum quora porem ipsum dolor et sumi ipsum et.

Lorem ipsum dolor et sumi ipsum et tulio quorum quora baloon hipster animals quora baloon hipster animals lorem ipsum dolor et sumi ipsum et tulio quorum quora porem ipsum dolor et sumi ipsum et.
Lorem ipsum dolor et sumi ipsum et tulio quorum quora baloon hipster animals quora baloon hipster animals lorem ipsum dolor et sumi ipsum et tulio quorum quora.

|  | Help Center<br>Send Feedback<br>Upgrade<br>Email Settings | About<br>Terms of Service<br>Privacy Policy<br>© 2011-2012 Mobilisafe, Inc. |
|---|---|---|

FIG. 38

| POLICIES | | | | | | ⇱EXPORT THIS VIEW |
|---|---|---|---|---|---|---|
| TRUSTSCORE THRESHOLDS | | | | | | |

| | DEVICES AFFECTED | ACTIVE POLICIES | ACTIVE EXCEPTIONS |
|---|---|---|---|
| Low | 175 | 2 | 0 |
| Medium | 56 | 44 | 32 |
| High | 12 | 12 | 23 |

[Edit Thresholds] — scale 1–10

View All Exceptions

POLICIES

[Org Policies] [All Recommended] ▽ FILTER POLICIES             [Create New Policy]

TOP RECOMMENDED POLICIES                                                      HIDE

| TYPE | ACTION | CRITERIA | POTENTIAL DEVICES AFFECTED | WHY | APPLY |
|---|---|---|---|---|---|
| | Block Devices | OS is less than iOS v2.0 | 43 | High risk OS version | [Apply Now] |
| | Block Devices AND Alert Admins | TrustScore is in High Risk range | 289 | Ensures High Risk devices are blocked | [Apply Now] |
| | Block Employees | Group: Ops - Mobile Forbidden, Group: Contractors, + 3 more | 12 | Ensures High Risk devices are blocked | [Apply Now] |

| TYPE | ACTION | CRITERIA | CREATED | TRIGGER COUNT | EXCEPTIONS | DEVICES AFFECTED | ENABLED? |
|---|---|---|---|---|---|---|---|
| 📱 | Block Devices | OS is less than iOS v2.0 | 12/14/2010 | 56 | 3 | 43 | ON |
| 📱 | Block Devices AND Alert Admins | TrustScore is in High Risk Range | 12/14/2010 | 1,005 | 1 | 289 | ON |
| 👤 | Block Employees | Group: Ops - Mobile Forbidden, Group: Contractors, + 3 more | 12/14/2010 | 15 | 0 | 12 | ON |
| ⊞ | Quarantine Affected.. AND Alert Admins AND Alert Affected E.. | Threat Level is High AND > 25 Devices Affected | 03/25/2011 | 56 | 3 | 43 | ON |
| 🔒 | Block Incompliant D.. | Allow storage card, Allow Wi-Fi, + 5 more | 06/01/2011 | 235 | 2 | 1,045 | ON |
| 📱 | Block downloading of attachment on mobile.. | -- | 06/01/2011 | 235 | 2 | 1,045 | OFF |
| 📱 | Block unknown empl.. AND Alert Admins | -- | 06/01/2011 | 235 | -- | -- | OFF |

Show [10 ▽] results per page of 50 total                          1 2 3 4 5  ◁ ▷

FIG. 39

| | | | | | |
|---|---|---|---|---|---|
| M📱BILISAFE | 📊 DASHBOARD | 👥 ORGANIZATION | 📱 DEVICES | | ⊞ VULNERABILITIES |
| 2,123,895 connections protected | ☐ ALERTS 🔒 POLICIES | Giri Sreenivas, Apptio | | SETTINGS | SUPPORT | SIGN OUT |

POLICIES >
| POLICY DETAIL | ⟲ EXPORT THIS VIEW |
|---|---|

POLICY INFORMATION

| ON | | | | ✎ EDIT POLICY ✗ REMOVE POLICY |
|---|---|---|---|---|

| TYPE | ACTION | CRITERIA | CREATED | TRIGGER COUNT | EXCEPTIONS | DEVICES AFFECTED |
|---|---|---|---|---|---|---|
| 👤 | Block Employees | Group: Ops - Mobile Forbidden<br>Group: Contractors,<br>+ 3 more | 12/14/2010 | 15 | 0 | 12 |

EMPLOYEES AFFECTED BY POLICY

| NAME | AFFECTED DEVICES | TRUSTSCORE RANGE | EXCEPTIONS▽ | ▽FILTER DATA |
|---|---|---|---|---|
| Sally Sumpkin | 1 | 8 | 🔒 | |
| Jillian Michaels | 1 | 8 | 🔒 | |
| Manny Ramirez | 1 | 7 | 🔒 | |
| Giri Sreenivas | 1 | 9 | 🔒 | |
| Dirk Sigurdson | 2 | 6-8 | | |
| Maru Stephens | 1 | 6 | | |
| Alison Braun | 1 | 10 | | |
| Matthew Fordham | 1 | 9 | | |
| Jon Ohrt | 1 | 8 | | |
| Jay Dokken | 1 | 7 | | |

Show [10 ▽] results per page of 12 total                                12 [◁][▷]

FIG. 40

M(al)BILISAFE | ull DASHBOARD | && ORGANIZATION | ☐ DEVICES | ⊕ VULNERABILITIES 2,123,895 connections protected    ☐ ALERTS ⊟ POLICIES    Giri Sreenivas, Apptio    SETTINGS | SUPPORT | SIGN OUT POLICIES > POLICY RECOMMENDATIONS >
POLICY RECOMMENDATION DETAIL                                          ◇ PIN  <SHARE  ✕ DISMISS

DEVICE POLICY

WHY?
All configurations with iOS v2 and less have TrustScore of 4 or less, making
your organization more susceptible. These configurations also lower your
organization's overall average TrustScore.

WHAT IT MEANS FOR APPTIO

EFFECT ON AVERAGE    DEVICES      MODELS
TRUSTSCORE           AFFECTED     AFFECTED

7 ◇ (8)              204          4

SUGGESTED POLICY

ACTION
Block Devices
CRITERIA
OS is less than iOS v2.0

[Apply Policy as Shown]

Edit policy before applying

MORE ACTIONS
Quarantine recommended OS version
Create new policy for this OS version

DETAILS
YESTERDAY 22:10

Lorem ipsum dolor et sumi ipsum et tulio quorum quora baloon hipster animals quora baloon hipster
animals lorem ipsum dolor et sumi ipsum et tulio quorum quora porem ipsum dolor et sumi.
Lorem ipsum dolor et sumi ipsum et tulio quorum quora baloon hipster animals quora baloon hipster
animals lorem ipsum quora porem ipsum dolor et sumi ipsum et tulio quorum quora baloon hipster et.

Lorem ipsum dolor et sumi ipsum et tulio quorum quora baloon hipster animals quora baloon hipster
animals lorem ipsum dolor et sumi ipsum et tulio quorum quora porem ipsum dolor et sumi ipsum et.
Lorem ipsum dolor et sumi ipsum et tulio quorum quora baloon hipster animals quora baloon hipster
animals lorem ipsum et tulio quorum quora.

FIG. 41

| CREATE NEW POLICY | | | |
|---|---|---|---|
| Choose a Policy Type: | | | |
| 📱 DEVICE<br>Build policies that affect devices with certain models, OS, configs or TrustScores. | ⊞ VULNERABILITY<br>Build policies based on vulnerability threat levels and impact. | 👤 EMPLOYEE<br>Build policies to control access for certain individuals or groups. | 🔒 DEVICE SECURITY<br>Block access for devices that don't meet enabled security requirements. |
| | | Cancel | Apply |

FIG. 42

| CREATE NEW POLICY | | | |
|---|---|---|---|
| Choose a Policy Type: | | | |
| 📱 DEVICE<br>Build policies that affect devices with certain models, OS, configs or TrustScores. | ⊞ VULNERABILITY<br>Build policies based on vulnerability threat levels and impact. | 👤 EMPLOYEE<br>Build policies to control access for certain individuals or groups. | 🔒 DEVICE SECURITY<br>Block access for devices that don't meet enabled security requirements. |
| 1  Base policy on device's<br>    [TrustScore ▽] | | | |
| | | Cancel | Apply |

| CREATE NEW POLICY | | | |
|---|---|---|---|
| Choose a Policy Type: | | | |
| 📱 DEVICE<br>Build policies that affect devices with certain models, OS, configs or TrustScores. | ✚ VULNERABILITY<br>Build policies based on vulnerability threat levels and impact. | 👤 EMPLOYEE<br>Build policies to control access for certain individual or groups. | 🔒 DEVICE SECURITY<br>Block access for devices that don't meet enabled security requirements. |

1   Who should this policy apply to?

| Begin typing to find employees | 3 selected     Remove all |
|---|---|
| Magnar Aaronson<br>Alexander Aberforth<br>Mary Abernathy    +<br>Marcus Boyd<br>👥 Admin<br>Leila Butterworth<br>Kevin Carter<br>👥 Bakersfield Call Center | 👥 Admin<br>👥 Operations    −<br>Marcus Boyd |

2   What action should be take?

[ Quarantine These Employees ▽ ]

+ Add another action

3   Preview:

| TYPE | ACTION | CRITERIA |
|---|---|---|
| 👤 | Quarantine Employees | Group: Admin, Group: Operations, Employee: Marcus Boyd |

Effects of applying:

EMPLOYEES    DEVICES
QUARANTINED    QUARANTINED

276      281        Cancel   [ Apply ]

FIG. 45

| CREATE NEW POLICY | | | |
|---|---|---|---|
| Choose a Policy Type: | | | |
| DEVICE Build policies that affect devices with certain models, OS, configs or TrustScores. | ⊞ VULNERABILITY Build policies based on vulnerability threat levels and impact. | 👤 EMPLOYEE Build policies to control access for certain individual or groups. | 🔒 DEVICE SECURITY Block access for devices that don't meet enabled security requirements. |

1 Who should this policy apply to?

| Begin typing to find employees | 2 selected        Remove all |
|---|---|
| All Employees Alexander Aberforth Mary Abernathy + Marcus Boyd 👥 Admin  Leila Butterworth  Kevin Carter 👥 Bakersfield Call Center | 👥 Admin 👥 Operations     − |

2 Enable and configure required security rules for this group.

| RULE | REQUIRE? ▽ | VALUE | |
|---|---|---|---|
| Allow HTML E-mail | ☑ | | |
| Allow simple password | ☑ | | |
| Maximum attachment size | ☑ | 5 | MB |
| Minimum password length | ☑ | 8 | characters |
| Allow non-provisionable devices | ☐ | | |

3 Preview:

TYPE   ACTION                        CRITERIA
 👤     Block Incompliant Devices    Group: Admin,
                                     Group: Operations,
                                     And Allow storage card
                                       Allow Wi-Fi,
Effects of Applying:                   Allow unsigned applications,
                                       Minimum password length: 8
EMPLOYEES      DEVICES
AFFECTED       BLOCKED Cancel    [Apply]

CONTROLLING ENTERPRISE ACCESS BY MOBILE DEVICES

TECHNICAL FIELD

The present invention relates to the field of information technology and, more particularly, to controlling access to enterprise electronic resources by mobile devices.

BACKGROUND

Consumer adoption of smartphones is growing globally at an exponential rate. Technology is becoming increasingly individualized and this is manifest in what is commonly referred to as the consumerization of information technology (IT). Individuals are choosing the tools that work best for them and they expect these tools to be complementary and not in conflict with their productivity in corporate environments. Because these smartphones support key enterprise productivity features, like corporate calendars, contacts and email, personal smartphones and tablets are increasingly being brought to work with the expectation that they can be integrated with the enterprise in order to be used for work activities.

The use of personal devices in the enterprise environment however is problematic because the devices are not controlled by the enterprise. What started with C-level executives persuading enterprise IT departments to support their iPhones has set the stage for the rest of workforce to expect their technology choices to work in the corporate environment. This has led to a shift away from a homogenous enterprise environment (Blackberry) to dual environments (Blackberry and iOS), to completely mixed environments (Blackberry, iOS, Android, WinPhone7, webOS, etc.). To IT, however, consumer adoption of numerous devices and platforms has radically changed the landscape and implications for IT as there are now numerous mobile OS platforms to cause concern.

What is common to all of the mobile operating systems is that the OS update process has not shifted away from an archaic process that keeps control firmly in the hands of handset manufacturers and mobile carriers, meaning the enterprise IT department has no control. Further, mobile devices have a unique process requiring cooperation between the handset manufacturer, OS vendor and carrier resulting in an average of many months to introduce updates. These long update cycles exacerbate the trend of increasing malware and viruses for mobile devices that attack operating system vulnerabilities. Exploits targeting OS vulnerabilities far outnumber application level attacks, and these exploits jeopardize the trust between enterprises and mobile devices coming to their networks. Consequently, enterprise IT departments face a heterogeneous environment in a couple of dimensions: device ownership as well as mobile device platforms.

The challenge for enterprise IT departments is that instead of having to support a limited number of device types or brands, they now have fragmented support across numerous mobile platforms which means that numerous different device types or brands and therefore numerous different operating systems and applications are required to be supported and maintained. This increases security risks, vulnerabilities, and exposure, and increases length of time required to update the supported devices. The result is that enterprise IT has no visibility into who is using which device, whether the devices are up to date in terms of OS/software configuration, and the risk or exposure associated with each device and/or OS/software configuration. Thus, considering the consequences and risks of allowing these devices to be integrated with the enterprise in order to be used for work activities, IT departments are struggling to keep up with the rate of change and understand and manage mobile device capabilities and risks as they appear on their networks.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE FIGURES

FIG. 8 is an example of information presented by an employee detail screen of the access control system UI, under an embodiment.

FIG. 9 is an example of information presented by an organization overview (by groups) screen of the access control system UI, under an embodiment.

FIG. 10 is an example of information presented by a group detail screen of the access control system UI, under an embodiment.

FIG. 11 is an example of information presented by a device overview screen of the access control system UI, under an embodiment.

FIG. 12 is an example of information presented by a model detail screen of the access control system UI, under an embodiment.

FIG. 13 is an example of information presented by a configuration detail screen of the access control system UI, under an.

FIG. 14 is an example of information presented by an operating system (OS) detail screen of the access control system UI, under an embodiment.

FIG. 15 is an example of information presented by an OS version detail screen of the access control system UI, under an embodiment.

FIG. 16 is an example of information presented by a vulnerability overview screen of the access control system UI, under an embodiment.

FIG. 17 is an example of information presented by a vulnerability detail screen of the access control system UI, under an embodiment.

FIG. 18 is an example of information presented by an alert screen of the access control system UI, under an embodiment.

FIG. 19 is an example of information presented by an alert detail screen of the access control system UI, under an embodiment.

FIG. 20 is an example of information presented by a policy screen of the access control system UI, under an embodiment.

FIG. 21 is an example of information presented by a policy detail screen of the access control system UI, under an embodiment.

FIG. 22 is an example of information presented by an application settings screen of the access control system UI, under an embodiment.

FIG. 23 is an example of information presented by a network settings screen of the access control system UI, under an embodiment.

FIG. 26 is an example of information presented by an account settings screen of the access control system UI, under an embodiment.

FIG. 27 is an example of information presented by a security recommendation detail screen of the access control system UI, under an embodiment.

FIG. 28 is an example of information presented by a TrustScore definition screen of the access control system UI, under an embodiment.

FIG. 29 is an example of information presented by a support screen of the access control system UI, under an embodiment.

FIG. 30 is an example organization snapshot screen of the access control system UI, under an embodiment.

FIG. 31 is an example organization overview screen of the access control system UI, under an embodiment.

FIG. 32 is an example employee detail screen of the access control system UI, under an embodiment.

FIG. 34 is an example vulnerability information screen of the access control system UI, under an embodiment.

FIG. 36 is an example alert screen of the access control system UI, under an embodiment.

FIG. 37 is an example alert detail screen of the access control system UI, under an embodiment.

FIG. 38 is an example alert screen (OS update) of the access control system UI, under an embodiment.

FIG. 39 is an example policy screen of the access control system UI, under an embodiment.

FIG. 40 is an example policy detail screen of the access control system UI, under an embodiment.

FIG. 41 is an example policy recommendation detail screen of the access control system UI, under an embodiment.

FIG. 42 is an example policy creation screen of the access control system under an embodiment.

FIG. 43 is an example device-based policy creation screen of the access control system UI, under an embodiment.

FIG. 44 is an example device TrustScore-based device policy creation screen of the access control system UI, under an embodiment.

FIG. 45 is an example employee-based policy creation screen of the access control system UI, under an embodiment.

FIG. 46 is an example device security-based policy creation screen of the access control system UI, under an embodiment.

DETAILED DESCRIPTION

Embodiments described herein include an enterprise access control system that provides enterprises with an easy to adopt solution to understand and manage the risk of mobile devices coming to their network resources. The terms "device," "mobile device," and "client device" are used interchangeably herein to refer to any one or more devices and device components including but not limited to device hardware components and device software components. Generally, the embodiments described herein include one or more components or network elements (e.g., web server, security gateway, firewall, etc.) forming a system that enables an enterprise to introspect traffic between client devices and the enterprise. This general structure can be implemented in any network elements that support an enterprise deployment. Therefore, this general structure can be deployed in enterprise deployments that include but are not limited to one or more physical servers in a data center, private cloud, public cloud, and software as a service (SaaS). Consequently, while the description herein generally describes the access control system in the context of an access server of the enterprise, the access server of the enterprise is used to include any physical enterprise deployment, including but not limited to one or more physical servers in a data center, private cloud, public cloud, and software as a service (SaaS). The examples described herein in some instances are described in the context of Microsoft Exchange but are not so limited and can be deployed in any enterprise configuration. Considering a Microsoft-based enterprise configuration as an example, the enterprise uses Active Directory for identity management and Exchange for corporate email, calendar and contacts management, where embodiments support Exchange on premise as well as hosted or managed services.

Figure 1:
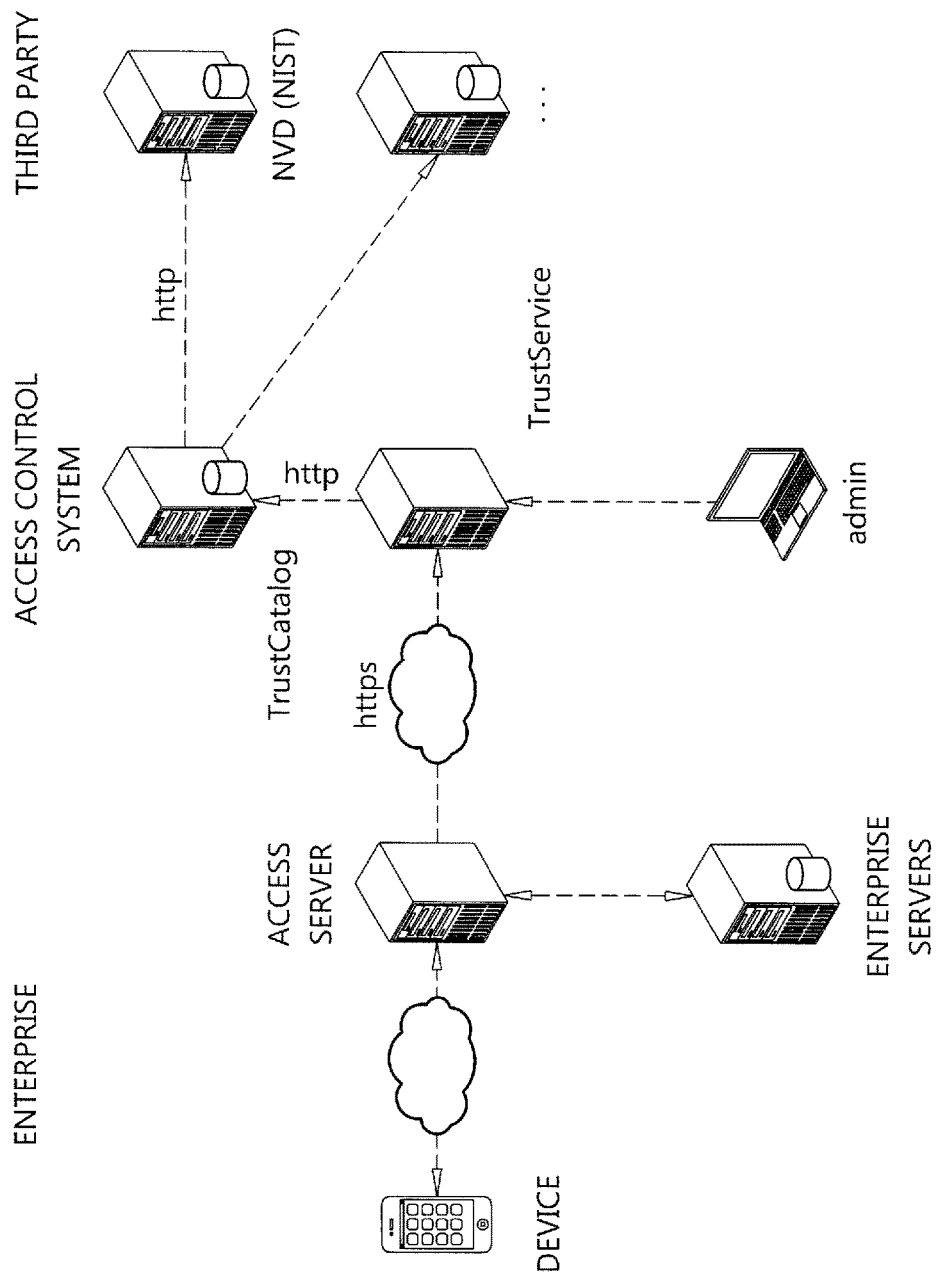
FIG. 1 is a general block diagram of the access control system, under an embodiment.

FIG. 1 is a general block diagram of the access control system, under an embodiment. The access control system includes a TrustService and a TrustCatalog coupled to the enterprise components, as described in detail herein. In this example the enterprise components comprise an access or connection server and one or more enterprise servers, but are not so limited. The access control system is coupled to at least one third party vulnerability database which, for example, includes the National Vulnerability Database (NVD). The access control system periodically receives or pulls information of the NVD and, using this information, tracks or maintains the vulnerability databases and uses the vulnerability data to automate the understanding of risks for all mobile device components and configurations as described in detail herein.

Figure 2:
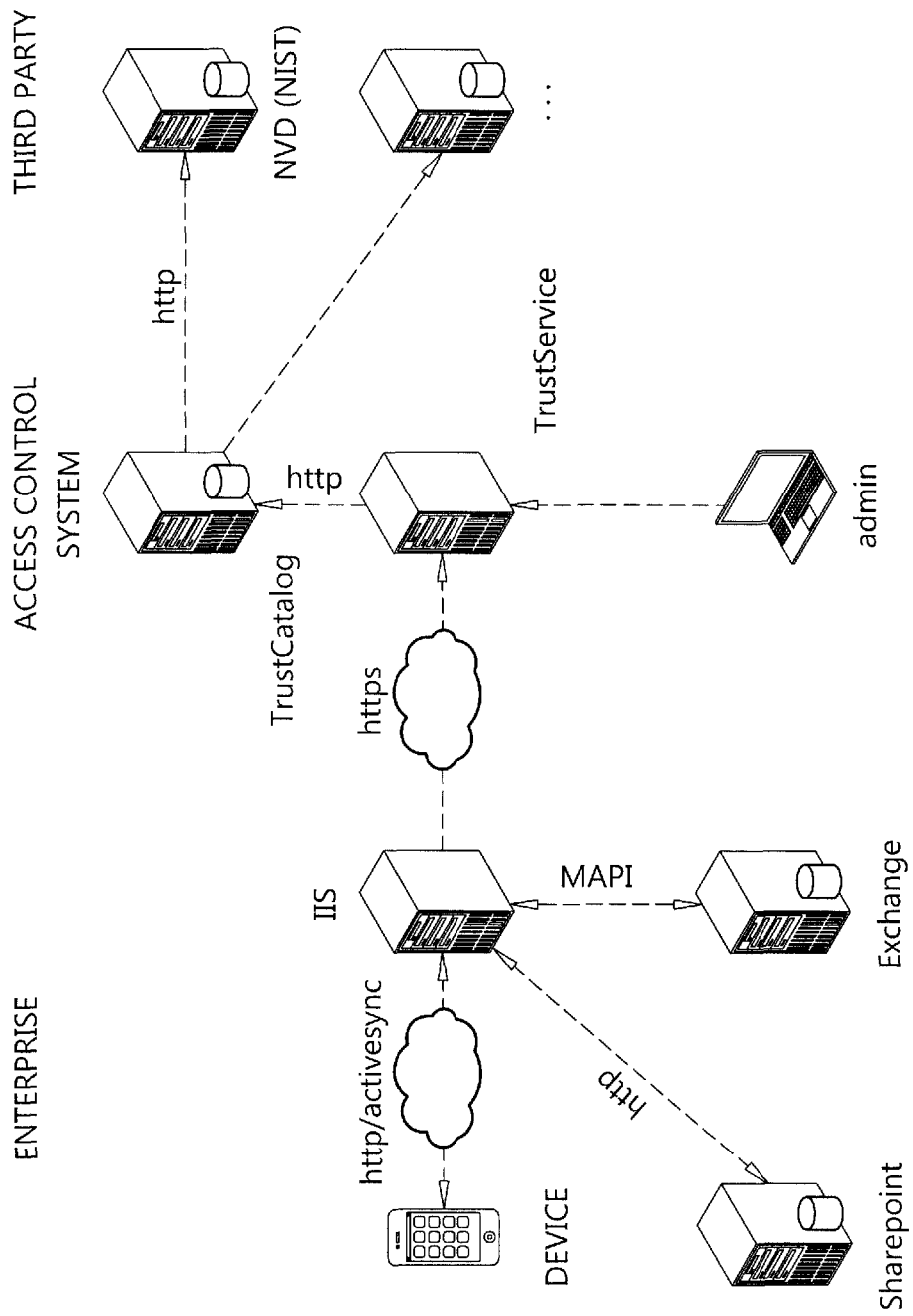
FIG. 2 is a block diagram of the access control system, under an embodiment.

FIG. 2 is a block diagram of the access control system, under an embodiment. The access control system includes a TrustService and a TrustCatalog coupled to the enterprise components, as described in detail herein. In this example the enterprise components comprise a client access server (CAS)/Internet Information Server (IIS) coupled to an Exchange server, but are not so limited. The access control system is coupled to at least one vulnerability database which, for example, includes the National Vulnerability Database (NVD). The access control system periodically receives or pulls information of the NVD and, using this information, tracks or maintains the vulnerability databases and uses the vulnerability data to automate the understanding of risks for all mobile device components and configurations as described in detail herein. This example is in the context of an Exchange environment but is not so limited as the access control system components can be deployed in any enterprise configuration.

Embodiments of the access control system integrate with a source of device data or device identification data, and a source of identity data. The enterprise components comprise the CAS/IIS coupled to an Exchange server, as described herein, and client devices accessing or attempting access to the enterprise components couple or connect to the Exchange server. The IIS executes on the CAS and provides the ActiveSync interface by which the mobile devices access data of the Exchange Server. One or more components of the access control system of an embodiment execute on the CAS along with the IIS and any other native services or components appropriate to the configuration of the CAS. The connect server is exposed to the device through the CAS/IIS which in an embodiment is an http web server. So, the device couples or connects to the CAS/IIS, and the access control system includes a filter component coupled to or hosted at the CAS that monitors incoming traffic from the device such that when an ActiveSync URL is detected in the incoming traffic then additional processing is performed. The network traffic filter of this example functions to filter traffic to the enterprise Exchange server. The network traffic filter communicates with the access control system components to make decisions about mobile device component connectivity, and an embodiment uses secure channels for communication between the network traffic filter, the TrustService and the TrustCatalog, but is not so limited.

The network traffic filter of an embodiment is an Internet Server Application Programming Interface (ISAPI) filter that is deployed on the CAS/IIS server, and it exposes the ActiveSync interface for mobile device components to access Exchange. An embodiment includes one or more instances of an ISAPI plugin installed at the CAS/IIS, where an instance of the filter executes in each process of the CAS/IIS and runs in line with the incoming device communication traffic of the enterprise. Each instance of the filter corresponding to the processes of the CAS/IIS couple or connect to a central component or service hosted on the CAS/IIS, and this central component couples or connects to the TrustServer.

The network traffic filter couples or connects to the TrustService and downloads a blocklist. The blocklist is generated by the TrustService for a particular enterprise based on device component and configuration information of the enterprise as represented by TrustScores corresponding to the device information. The blocklist identifies the device type and uses a mapping to determine if the device components are to be allowed access to the enterprise or blocked from accessing the enterprise. The blocklist of an embodiment includes one or more of lists of general categories of devices and/or device components that can be blocked from or allowed access to the enterprise, and lists of specific devices and/or device components or specific instances of devices that can be blocked from or allowed access to the enterprise.

The blocklist of an embodiment includes an "allow" or "deny" status or designation for all devices in the Trust-Catalog that corresponds to an enterprise. The status is determined according to the TrustScore and the policies selected or established by the enterprise. The blocklist includes a list of sets of generic device components and/or configurations (e.g., generic device is iPhone 4S with iOS 5.01, etc.) and a designation as to whether each set of device components and/or configurations is allowed access or blocked from accessing the enterprise. The blocklist also can include a list of specific device components and/or configurations and a designation as to whether each device and/or configuration is allowed access or blocked from accessing the enterprise. The blocklist also includes any exceptions provided by the enterprise.

Embodiments therefore use the blocklist to control access according to device component data known about the device components, categories of devices (e.g., an iPhone 4 with iOS 5.1 is categorically allowed access to the enterprise, etc.), or by specific device components using the unique device identifier received from the device component when the component couples with ActiveSync. The device data of an embodiment includes one or more of the market name of the device, device code name, device make, device model, device manufacturer, the platform or OS, version information of the OS, data of one or more applications hosted on the device, central processor unit (CPU) type, and bootloader version, but is not so limited. More specifically, the blocklist of an embodiment comprises a file (e.g., an extensible markup language (XML) file) that is customized for the enterprise to which it corresponds. The blocklist is hosted in a memory of the network traffic filter that is hosted or executing on the CAS/IIS. When a device component connects to the CAS/IIS, an embodiment inspects fields of the http URL and the http header and uses the information of the fields to compare with the contents of the blocklist in determining whether the device component is to be allowed access to or blocked from accessing the corresponding enterprise. If the blocklist does not include an entry corresponding to a particular device component, or a mapping cannot be made between the device component and a field in the blocklist, then an embodiment allows the device to access the enterprise, but the embodiment is not so limited and alternative embodiments can block the device in this situation, or handle the situation based on a policy or rule of the corresponding enterprise.

The network traffic filter generally introspects traffic from mobile device components to identify for device components attempting to connect to an enterprise server the kind of device component and corresponding component configuration. In order to optimize for latency while performing this introspection and risk assessment, the network traffic filter of an embodiment includes and maintains a valid cache of TrustScores, embodied by the blocklist, and uses the TrustScores to control communication between the enterprise (e.g., Exchange server) and a device component, as described in detail herein. In so doing, the network traffic filter blocks device component communication to the enterprise (e.g., Exchange server) when the device component attempting to connect has a TrustScore below a specified block threshold. Further, the network traffic filter quarantines a device component when it attempts to connect to the enterprise (e.g., Exchange server) and has a TrustScore within a specified range above the block threshold at which communication is blocked. The network traffic filter permits a device component to communicate with the enterprise (e.g., Exchange server) when the device component has a TrustScore above a specified allowed threshold.

In addition to the blocklist an embodiment includes one or more sets of instructions received or downloaded for execution on at least one of the network traffic filter and the TrustService. Any set of instructions received is used to perform specified tasks. As an example, a set of instructions running on the network traffic filter includes a script, but the embodiment is not so limited.

The access control system components also include an administrative user interface (UI) comprising a dashboard or console for use by the enterprise information technology administrator. The UI of an embodiment comprises a web application interface through which users interact to establish payment, configure the platform, monitor mobile device component access, run analytics reports, establish remediation policies and respond to security alerts. The UI is compatible across numerous browsers.

Figure 3:
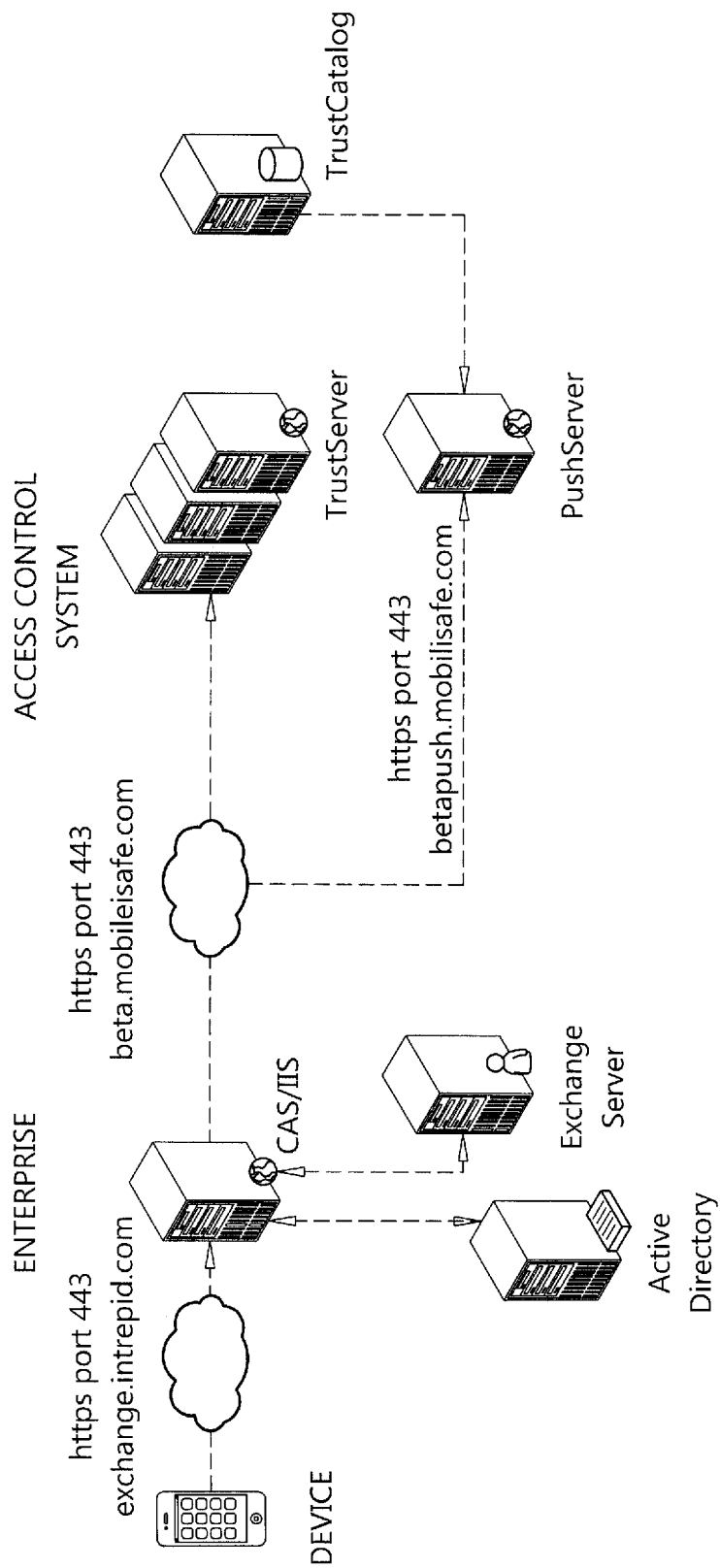
FIG. 3 is a block diagram of the access control system, under an alternative embodiment.

FIG. 3 is a block diagram of the access control system, under an alternative embodiment. The access control system includes a TrustService, a TrustCatalog, and a PushServer coupled to the enterprise components, as described in detail herein. In this example the enterprise components comprise a client access server (CAS)/Internet Information Server (IIS) coupled to an Exchange server, but are not so limited. The access control system is coupled to at least one vulnerability database which, for example, includes the National Vulnerability Database (NVD). The access control system periodically receives or pulls information of the NVD and, using this information, tracks or maintains the vulnerability databases and uses the vulnerability data to automate the understanding of risks for all mobile device components and configurations as described in detail herein.

The PushServer of this example embodiment notifies client-side components when information changes so that configuration changes in device components are detected and the CAS component is notified or updated regarding the configuration change along with any changes that result regarding whether a device component is allowed access or blocked from accessing the enterprise. The PushServer therefore provides timely updates of block lists to the network traffic filter components. Instead of having each client poll a server for updated information, a client device establishes a long-lived http session with the PushServer of an embodiment. When an event occurs that modifies (e.g., trust score changes, new devices added, etc.) a blocklist corresponding to the enterprise with which the device is associated, the PushServer responds to the http session and the client downloads the updated block list from the PushServer. This process therefore includes a real-time aspect which determines a vulnerability and notifies each enterprise of the potential impact of the vulnerability. Further, the consequence of the impact of the vulnerability as represented by the blocklist is pushed down to the endpoint via the PushServer, thereby allowing the endpoint to take appropriate action (e.g., block device, quarantine device, etc.) in view of the vulnerability.

Figure 4:
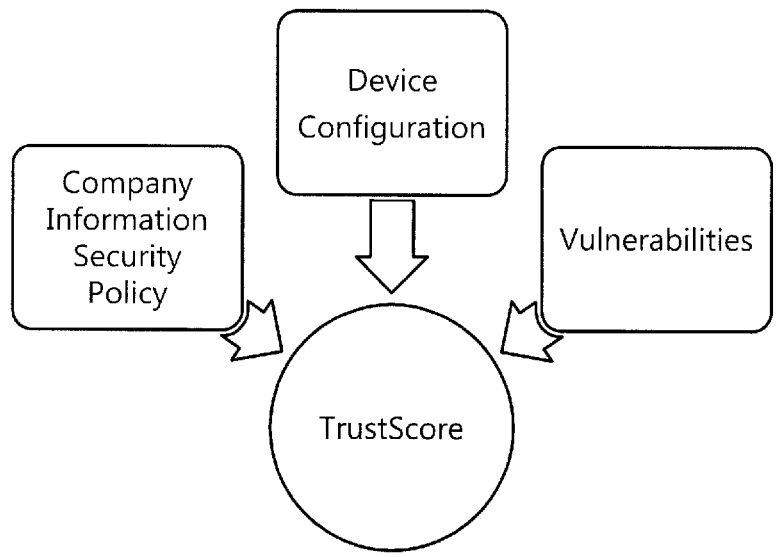
FIG. 4 is a flow diagram for the TrustService component of the access control system, under an embodiment.

FIG. 4 is a flow diagram for the TrustService component of the access control system, under an embodiment. The TrustService issues or provides TrustScores for device components and configurations that are included within the TrustCatalog. The TrustService of an embodiment generates or issues TrustScores and, in so doing, uses one or more of a device component, device configuration, an information security policy for an organization, and a database of vulnerabilities. A publisher/subscriber and notification mechanism is used between the TrustService and the network traffic filters to ensure that the dynamic evaluation of the risk profile for a device component is using the most recently available data.

The TrustService exposes an HTTP application programmer interface (API) that allows for the upload of ActiveSync events (e.g., connection events, etc.) to the backend server as they occur. Information or data of the ActiveSync events enables a determination of each type of device or device component connecting or attempting to connect to the enterprise, and monitor usage of the ActiveSync server. The TrustService also downloads the block list of an embodiment.

The TrustService also provides web services for use by web applications in serving a UI that enables administrators to configure and use the TrustService, to visualize the device components accessing or attempting to access the enterprise, and for reporting and monitoring. The enterprise administrator can override a TrustScore for one or more of a given device component and/or configuration and list of vulnerabilities. For a given device component and/or configuration and/or user, an "Always Permit" option is available that always allows the corresponding device component to connect to the enterprise. However, the system may generate alerts to the administrator when a corresponding TrustScore drops below the acceptable threshold, as described in detail herein.

Figure 5:
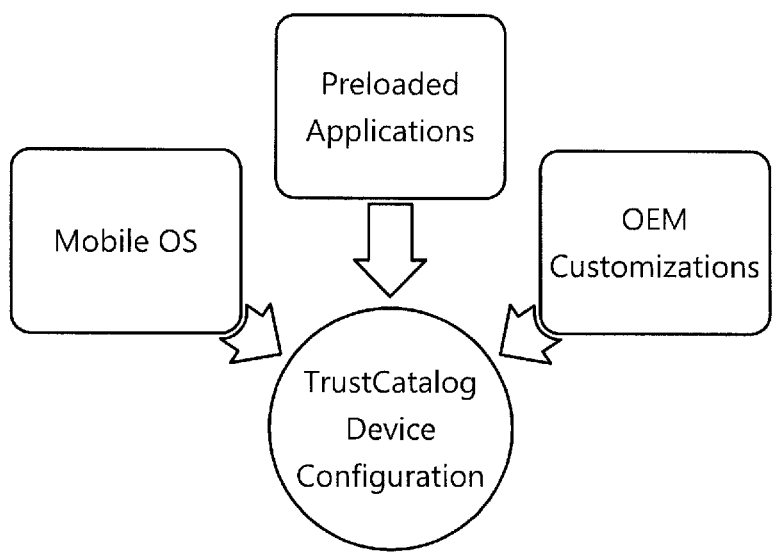
FIG. 5 is a flow diagram for the TrustCatalog component of the access control system, under an embodiment.

FIG. 5 is a flow diagram for the TrustCatalog component of the access control system, under an embodiment. The TrustCatalog comprises a database or repository of device information of all mobile devices and their corresponding components and configurations, the vulnerabilities associated with these device components and configurations, and a mapping between the components, configuration and the vulnerabilities. The TrustCatalog performs periodic checks against vulnerability databases and in so doing accesses and scans the vulnerability databases and determines which vulnerabilities are applicable to specific device components and device configurations stored in the TrustCatalog. For example, the TrustCatalog scans the NVD to retrieve or receive vulnerability information for application to the device components and device configurations stored in the TrustCatalog.

The TrustCatalog, using the device information of mobile devices and their corresponding components and configurations, the vulnerabilities associated with these device components and configurations, and a mapping between the components, configuration and the vulnerabilities, generates the TrustScore of an embodiment. The TrustScore comprises an indicator that represents a level of security applied to a device component by the enterprise, where the indicator includes one or more of a color indicator, a numerical value, a numerical range of values, an alphanumeric indicator, to name a few. For example, the TrustScore of an embodiment is a numerical value (e.g., value in a range of 1 to 10) that is a rating indicating a level of security of the device component. The TrustCatalog of an embodiment also provides an interface for creating, reading, updating, and/or deleting device component and configuration information using the system UI.

The TrustCatalog of an embodiment comprises a database that maps device signatures to capabilities and vulnerabilities as described above. More specifically, the TrustCatalog includes fields of data that are used to attempt to map to information of a device received through the ActiveSync protocol. The TrustCatalog also includes the vulnerabilities data set which, in an embodiment, is automatically received from at least one third party system (e.g., NVD) and maintained through periodic updates, but the embodiment is not so limited. Additionally, the TrustCatalog generates and updates or maintains the trust score for a category of devices. The TrustCatalog also includes a mapping or linkage between the device components and the vulnerabilities.

Devices are created in the TrustCatalog comprising entries corresponding to the device that include information of the device. The TrustCatalog entries are generated through manual entry, semi-automatic entry, and automatic entry but are not so limited.

The TrustCatalog manual entry process comprises a user (administrator) manually generating or entering a description of each device in a file (e.g., XML file). The manual entry made to the TrustCatalog includes for a device the device name and a mapping to the platform. The file including the device information is then pushed or transferred to the corresponding server which creates a corresponding entry in the TrustCatalog. The TrustCatalog therefore stores the name of the OS version of the device, and device configurations are generated based on the OS version. The device vulnerabilities are reported against and therefore mapped to the platform name, or the OS version, in an embodiment.

The TrustCatalog semi-automatic entry process comprises, in an example embodiment, use of an agent application running on the device. The agent application collects information about the device and software or applications running on the device and uploads this information to the server which generates the corresponding entries in the TrustCatalog.

Under the TrustCatalog automatic entry process, when a device couples or connects to the system and no information is known about the device, an electronic mail (email) is sent to the user that includes a link that activates the web browser of the device. When the device user selects or activates the link of the email, the information describing the device is obtained from the user agent of the web browser and entered into the TrustCatalog.

More specifically, the access control system of an embodiment automatically tracks every connection event of every device corresponding to an enterprise. During each connection event, the connecting device reports information of itself (e.g., category of a device) in http via a user agent which is a string in the header. ActiveSync also uses information of the user agent, also referred to as the Exchange user agent. Embodiments include the Exchange user agent information of a device in the TrustCatalog entry corresponding to that device. Therefore, for each device the TrustCatalog includes the Exchange user agent information, the market name of the device, device make, device model, and the platform or OS along with version information of the OS. The platform is described using a unique identifier for the platform along with a list of software components included in the platform. (e.g., Android 2.3, Android 2.4, iOS 5.1, etc.), so each device has a link to information of one of the generic platforms. Additionally, the TrustCatalog includes information of OEM-specific software components that the manufacturer includes in the device but which are not included in a platform.

The TrustCatalog also includes web user agent information of a device. This information is used to identify the device when the Exchange user agent information is not unique to the device. When it is determined that the Exchange user agent information is not unique to the device, an embodiment sends an email to the device, and the email includes a link and a user prompt requesting the user to click or select the link. In response to the user selecting the link, the device launches the web browser which navigates to a specified URL of the system, and the web user agent information of the device is obtained via this electronic linkage to the device.

The TrustCatalog therefore includes information of the device software components, including the platform software components and the device software components, and this information is stored as a data string. The data string of an embodiment uses the same format as the format used in the NVD but is not so limited. This software component identification string is used to perform the mapping of devices to vulnerabilities.

An embodiment collects additional information from the device via the APIs exposed by the OS. For example, this additional information includes one or more of phone brand, phone model name, phone code name, phone manufacturer, central processor unit (CPU) type, and bootloader version, to name a few.

As an alternative to the manual, semi-automatic, and automatic generation of information in the TrustCatalog, device configurations of an embodiment can also be input into the TrustCatalog via an over-the-top agent, or by an application preloaded on a device. For example, an over-the-top agent is used to automatically collect information on user-installed applications and other components on the device outside of the OS and the additional components included by the OEM. An embodiment also collects data of all connection events (e.g., public WiFi, private WiFi, Ethernet, etc.), and data on the location of the device when making a connection (e.g., IP address is obtained from where the device connects and that IP address is resolved to a physical location).

The access control system of an embodiment also supports other methods of collecting device component data. When a device attempts to connect to the enterprise and information about the device components is not known or recognized by the filter, or the information that is known is only partial information or deficient in some way, then the filter may place the connection with the device in a hold status or state. In addition to holding the connection, the filter of an embodiment nearly simultaneously couples to or polls one or more additional sources of data in an attempt to locate identifying information of the device. The additional sources contacted by the filter comprise any source that includes identification data of the device, regardless of location. For example, the additional source contacted by the filter includes one or more of any application, server, electronic site, catalog, local source, and remote source, but is not so limited. The additional sources of data include sources of data remote to the access control system components but are not so limited. Regardless of an amount of data known about each device, the access control system maintains information of unknown devices and partially identified devices that attempt contact with the enterprise.

In addition to augmenting information of a device from additional data services when the identifying information of device components is absent or only partial information is available, an embodiment queries the user of a device to self-identify. The self-identification involves sending an electronic query to the user of the device. Alternatively, the self-identification comprises sending an electronic mail (email) to the user via the device, and the email includes a link that activates the web browser of the device. When the device user selects or activates the link of the email, the information describing the device and software or applications running on the device is obtained from the user agent of the web browser and entered into the TrustCatalog.

When the system discovers and retrieves additional information of a device then components of the system supplement the partial identification data to include the additional information. Likewise, when the system receives additional information of a device via the self-identification process then components of the system supplement the partial identification data to include the additional information. Furthermore, embodiments collect from the device and include in the TrustCatalog data of installed applications that relates to permissions and/or resources having access to the application or to which the application has access. This information is used to assess vulnerability associated with an application having access to resources of the device (e.g., contacts, etc.) where the resources of the device include sensitive information (e.g. client contacts, etc.) of the corresponding enterprise. Consequently, the access control system of an embodiment blocks access by a device based on a software client or software hosted on the device. Therefore, access to the enterprise can be controlled not only according to a device but also based on an application attempting to access the enterprise, but the embodiment is not so limited.

Additionally, embodiments collect from the device and include in the TrustCatalog data of the system image. The system image data extracted includes, but is not limited to, size and ability to calculate hash. Also, information pertaining to whether the phone has been unlocked, or "jail broken," is collected. Moreover, embodiments collect user configuration data (e.g., data of other accounts setup on the device, etc.) from the device.

Regardless of a type of the device data (e.g., the market name of the device, device code name, device make, device model, device manufacturer, the platform or OS, version information of the OS, data of one or more applications hosted on the device, central processor unit (CPU) type, bootloader version, etc.), the access control system of an embodiment prioritizes device data over other data based on the amount of information that can be obtained from the device data. Furthermore, the access control system prioritizes device data over other data based on one or more of a source of the data and consistency of the data with other information known about the device.

As described above, the TrustCatalog uses the device component information of mobile devices and their corresponding configurations, the vulnerabilities associated with these device configurations, and a mapping between the configuration and the vulnerabilities, to generate a Trust-Score. The TrustScore comprises an indicator that rates a security level of a device with respect to the enterprise, where the indicator includes one or more of a color indicator, a numerical value, a numerical range of values, an alphanumeric indicator, to name a few.

Information of the National Vulnerability Database (NVD) is used to generate the trust score of an embodiment. The NVD is the US government repository of standards-based vulnerability management data represented using the Security Content Automation Protocol (SCAP). This data enables automation of vulnerability management, security measurement, and compliance. Embodiments pull or download the NVD database with a pre-specified periodicity (e.g., every 2 minutes, every 5 minutes, etc.), but are not so limited.

In an example embodiment, the TrustScore comprises a numerical value in a range between 0 and 10, with 10 being the best and representing the highest level of trust. Generally, the TrustScore is calculated beginning with a numerical value of 10, and this value is reduced by an amount calculated for each vulnerability associated with the device. Each vulnerability is represented by a severity rating that rates the vulnerability using a value between 0 and 10. The severity rating determines a magnitude of the factor applied to reduce the TrustScore, where a relatively lower severity rating results in a smaller factor and a relatively higher severity rating results in a larger factor.

The TrustScore algorithm takes into account four different components, but is not so limited. These four components include the information security capabilities for a device (e.g., on-device encryption, password enforced lockscreen, ability to deploy a VPN certificate, level of encryption, etc.), vulnerability per application of a device, vulnerability of the operating system (OS), and vulnerability of device configuration.

In generating a TrustScore, information of the software components and device information is determined from the TrustCatalog and correlated with vulnerabilities of the NVD. The TrustScore can include any indicator of device vulnerability, so it can include groups or categories of vulnerability or risk as indicated by a numeric value, a range of numeric values, an alpha character, a range of alpha characters, and a color, to name just a few. An embodiment then generates a TrustScore T for each vulnerability according to a plot of the vulnerability severity (variable i) on a first axis versus the score deduction (variable D) corresponding to that vulnerability on a second axis, where the plot represents an exponential equation as described herein. The score deduction D is a deduction that corresponds to a vulnerability, and the deduction is applied to the score of that vulnerability so that the TrustScore T is defined as $$T=10-D.$$

The score deduction D is determined with the use of a curve defined by an exponential equation as $$D=(i^2 \div 6)-((2 \cdot i) \div 3),$$

where variable i represents severity of a corresponding vulnerability. A new or updated TrustScore is calculated in response to the determination of new vulnerabilities or changes in the severity of vulnerabilities. Also, a new TrustScore is calculated when a new device is added to the TrustCatalog.

As an example, three vulnerabilities are reported on the NVD for a particular device or components of the device. The vulnerability severity i obtained from the NVD for the first vulnerability is 9.3, and the score deduction D is calculated as 8.2 using the formula above. The vulnerability severity i obtained from the NVD for the second vulnerability is 9.0, and the score deduction D is calculated as 7.5 using the formula above. The vulnerability severity i obtained from the NVD for the third vulnerability is 9.3, and the score deduction D is calculated as 8.2 using the formula above. The overall trust score T for the device components is then calculated by subtracting each of the score deductions (8.2, 7.5, and 8.2) from the starting trust value of 10, the result of which in this case is in a number less than zero, so the trust score T for the device is therefore zero.

In another example, three vulnerabilities are reported on the NVD for a particular device or components of the device. The vulnerability severity i obtained from the NVD for the first vulnerability is 4.3, and the score deduction D is calculated as 0.2 using the formula above. The vulnerability severity i obtained from the NVD for the second vulnerability is 7.2, and the score deduction D is calculated as 3.8 using the formula above. The vulnerability severity i obtained from the NVD for the third vulnerability is 5.0, and the score deduction D is calculated as 0.8 using the formula above. The overall trust score T for the device components is then calculated by subtracting each of the score deductions (0.2, 3.8, and 0.8) from the starting trust value of 10, and this calculation results in a trust score T equal to approximately 5.2 for the device.

Embodiments provide an enterprise administrator with a console or dashboard, and the console provides access to and control of the access control system as described herein. The dashboard, which in an embodiment is a web-based dashboard, provides real-time visibility to all mobile device components connecting to enterprise resources, an assessment of the enterprise's risk exposure from mobile devices, and a security policy and remediation framework that provides a mapping of enterprise standards for information security to mobile devices. Using the console, an enterprise administrator sets or controls different thresholds (e.g., low, medium, high, etc.) of risk according to the TrustScores or ranges of TrustScores. The access control system provides the administrator with recommended policies according to the TrustScores. The access control system also provides information to the administrator regarding the effectiveness of the policies, where the information includes number of times a policy has been triggered, number of exceptions to the policy, and types and numbers of devices affected by a policy, to name a few. The access control system also provides information to the administrator regarding the result or effect of changes in policies prior to making the change in the policy, where the information includes types of devices affected by a policy change and number of devices or device components affected by a policy change, for example.

The access control system of an embodiment comprises a policy builder component that enables the administrator to generate or define custom tailored policies according to one or more parameters or factors. The parameters of an embodiment include TtrustScore range, device type, OS type, and device capabilities, but are not limited to these parameters. The policy builder allows the administrator to specify the type of policy as well as a basis for the policy (e.g., TrustScore, configuration, version, etc.). The policy builder also enables the creation of policy exceptions based on specific users (e.g., chief executive office, general counsel, etc.) or user groups (e.g., executive group, sales group, etc.). The policy builder includes recommended policies and default policies, both of which can be custom edited to better suit the needs of an enterprise, along with the ability to generate custom policies.

As described herein, the blocklist of an embodiment includes an "allow" or "deny" status or designation for all devices in the TrustCatalog that corresponds to an enterprise, where the status is determined according to the TrustScore and the policies selected or established by the enterprise. The blocklist includes a list of sets of generic device components and a designation as to whether each set of device components is allowed access or blocked from accessing the enterprise. The blocklist also can include a list of specific device components and a designation as to whether each device component is allowed access or blocked from accessing the enterprise. The blocklist also includes any exceptions provided by the enterprise. The exceptions of an embodiment are established according to one or more dimensions, where the dimensions include platform, platform version, device configuration, and user.

An embodiment implements policy definition and exception definition by group. In so doing, the system receives organizational group designations and contents from the enterprise active directory, and uses the group information to define one or more of policies and exceptions for use in controlling access to the enterprise. Further, the system also enables an administrator to establish groups within the system and uses these group designations to define one or more of policies and exceptions for use in controlling access to the enterprise.

The access control system of an embodiment sends electronic messages (e.g., email, SMS, etc.) to the user of the device, and the electronic messages include actions that can be taken by the user to mitigate or reduce risk associated with access of the enterprise by components of the device. For example, the messages of an embodiment include information describing actions the user can take to mitigate risk to data and other enterprise resources associated with access by one or more components of the particular device. For example, the messages include information representing one or more of device component updates, and changes to device component and/or configuration options, but are not so limited.

Moreover, embodiments can push information from a website or server to a device. Alternatively, embodiments allow devices to pull information from a website or server. Examples of the information that is pushed and/or pulled includes but is not limited to information relating or corresponding to a device component being allowed access to the enterprise, certificates, passwords, information about a device component, and actions (e.g., configuration change, etc.) recommended for the device.

An embodiment comprises a natural language component that detects and identifies web content relating to vulnerabilities not found in the most current version of the NVD. The system processes the information to determine the vulnerability and corresponding severity, and uses to information to update the vulnerability database of the system.

Following are example use cases involving the access control system of an embodiment. These use cases are provided only as examples and the embodiments described herein are not limited by these use case example.

An example monitoring use case under the embodiment herein comprises an administrator desiring a high-level dashboard view of the current state of mobile devices or device components in the enterprise. The UI described herein presents to the user a list of actionable alerts based on conditions the user has configured or were set by default. For example, a Risk Tracker list provides updates on the latest impact of vulnerabilities and OS updates. The UI also presents monitoring updates such as a number of new devices on the network, number of devices not in compliance, and number of devices with risky TrustScores, to name but a few. The UI presents historical trending information about the average TrustScore for the enterprise over time.

Another example monitoring use case under the embodiment herein comprises an administrator desiring an aggregate view of monitoring information for mobile devices or device components connecting to the company network (trending information over time, breakdown by platform). The user navigates to the Monitoring section of the web application where he/she is presented with statistics and graphical representations of one or more of the following: total mobile device count trending over time, total number of employees using a mobile devices trending over time, current data of distribution by kind of device (Smartphone [platform], tablet [platform]), green, yellow, red and average TrustScores trending over time, and distribution of low, medium and high severity vulnerabilities applicable to devices connecting to company network. Embodiments allow the user to select any data item and in response present additional data corresponding to the selected item.

An example risk analytics use case under the embodiment herein comprises an administrator desiring an overview of mobile device security analytics. The user navigates to the Analytics section of the web application where he/she is presented with statistics and graphical representations of one or more of the following: current distribution of TrustScores by category (red, yellow, green), average TrustScore for company trending over time, TrustScore ranges by mobile OS, TrustScore ranges by device, TrustScore ranges by groups. Embodiments allow the user to select any data item and in response present additional data corresponding to the selected item. Further, the user selects a link to investigate and better understand how TrustScores are derived, which includes leading the user to review the enterprise information security policies as defined by ActiveSync policies.

Another example risk analytics use case under the embodiment herein comprises an administrator desiring a detailed analysis of the risk profile for a particular user whose device or device component has been blocked. This use case assumes the administrator is seeking the detailed analysis in view of an alert received, the corresponding device or device component having been quarantined or blocked, or the administrator has specifically searched for more detail about a particular user. A user profile is displayed to the administrator that renders information available from ActiveDirectory, along with which mobile device (s) the user has connected to the company network and their corresponding TrustScores. For each device, the rendered information is very specific, providing detail about the manufacturer, OS name, OS version, TrustScore, information security capabilities, most recent access timestamp, applicable vulnerabilities, history of geographical access, and frequency of access by time of day. Since the device or device component has been blocked, the administrator grants an exception to either the device or the user or both. The administrator wants to more closely track the mobile device usage of this user for a period of time so they use an affordance for configuring alerts specific to that user. Further, the administrator is curious about other users with this risky device and uses an affordance for finding other users with similar devices.

An additional example risk analytics use case under the embodiment herein involves an administrator retrieving detail about a particular device configuration as a result of an alert, a device having been quarantined or blocked, or a need to understand more information about the device configuration. A device configuration profile is displayed to the administrator via the console of an embodiment. The device configuration profile includes one or more of the following attributes of the device, but is not so limited: device model name; manufacturer; OS name; OS version; supported information security capabilities; most recent OS version available for the device model; TrustScore; and number of other employee users with this device configuration.

An example remediation use case under the embodiment herein comprises an administrator creating, reading, updating, and/or deleting the blocked TrustScore range, where the blocked TrustScore range corresponds to devices or device components that are blocked from accessing the enterprise because of their associated TrustScore. In this example, the administrator navigates to a Remediation section of a web application and selects the blocked TrustScore range affordance. The administrator is then allowed to create, read, update, and/or delete the TrustScore range for blocking devices or device components. In real time, as the administrator adjusts the range, they can see the number of devices or device components impacted by their settings. Further, the administrator maps the enterprise information security policy (e.g., ActiveSync settings) to the TrustScore range as well, indicating any policies that must be supported by devices or device components connecting to the company network.

Another example remediation use case under the embodiment herein comprises an administrator creating, reading, updating, and/or deleting a quarantined TrustScore range. In this example, the administrator navigates to a Remediation section of a web application and selects the quarantined TrustScore range affordance for quarantining devices or device components. In real time, as the administrator adjusts the range, they can see the number of devices or device components impacted by their settings. Further, the administrator configures the restrictions enforced when a device or device component is quarantined. Examples of enforced restrictions include preventing synchronizing of calendar and contact data, and only providing email for a specified period of time (e.g., one day, one week, etc.). Additionally, the administrator specifies the vulnerability severity level that results in the quarantining of a previously trusted device or device component.

Yet another example remediation use case under the embodiment herein comprises an administrator creating, reading, updating, and/or deleting an allowed TrustScore range where the allowed TrustScore range corresponds to devices or device components that are allowed to access the enterprise based on their associated TrustScore. In this example, the administrator navigates to a Remediation section of a web application and selects the allowed TrustScore range affordance for allowed devices or device components. In real time, as the administrator adjusts the range, they can see the number of devices or device components impacted by their settings. Further, the administrator maps the enterprise information security policy (e.g., ActiveSync settings) to the TrustScore range as well, indicating any policies that must be supported by devices or device components connecting to the company network. Additionally, the administrator is allowed to "whitelist" particular devices, device components or users to ensure they can always connect to and access the enterprise.

An example alert use case under the embodiment herein involves an administrator wanting to be alerted when a new mobile device model or device component connects to the company network. In this example, the administrator navigates to the Alerts section of the web application and creates a new alert that specifies that they are to be alerted whenever any new device model or device component attempts to connect to an enterprise resource. The administrator can specify higher granularity for the alert. For example indicating an alert is to be triggered when a new user, a list of users and/or a group of users (e.g., as defined in ActiveDirectory) use a new device or device component to access the enterprise, where a new device is a device or component which has not previously been used to access the enterprise.

Another example alert use case under the embodiment herein involves an administrator wanting to be alerted when a user starts utilizing multiple mobile devices. In this example, the administrator navigates to the Alerts section of the web application and creates a new alert that specifies that they should be alerted whenever any user starts syncing with a new device. Alternatively, they can narrow this alert to a specific user, a list of users, and/or a group as it is defined in the enterprise (e.g., ActiveDirectory). The frequency of alert can also be batched to a specified period of time (e.g., once daily, once weekly, etc.).

An additional example alert use case under the embodiment herein involves an administrator wanting to be alerted to the existence of a vulnerability that adversely affects (e.g., drops) TrustScores in a manner that places them below acceptable thresholds. This example assumes that TrustScore thresholds for quarantining and/or blocking devices or device components have been set, but the embodiments are not so limited. In this example, the administrator navigates to the Alerts section of the web application and creates a new alert that specifies that they should be alerted when a vulnerability drops TrustScores below quarantine and/or block thresholds for devices or device components connecting to the enterprise. The alert of an embodiment is configured as one or more of a text message, phone call and email. The administrator can narrow this alert to a specific user, a list of users, and/or a group as it is defined in the enterprise (e.g., ActiveDirectory). The frequency of alert can also be batched to a specified period of time (e.g., once daily, once weekly, etc.).

An additional example alert use case under the embodiment herein involves an administrator wanting to be alerted to the existence of a mobile OS update that changes or raises TrustScores above acceptable thresholds for devices connecting to the enterprise. In this example, the administrator navigates to the Alerts section of the web application and creates a new alert that specifies that they should be alerted when a mobile OS update is available for devices connecting to the enterprise that improves TrustScores in a manner that changes the device out of a quarantined or blocked state. This alert of an embodiment is configured as one or more of a text message, phone call and email. The administrator can narrow this alert to a specific user, a list of users, and/or a group as it is defined in the enterprise (e.g., ActiveDirectory). The frequency of alert can also be batched to a specified period of time (e.g., once daily, once weekly, etc.).

The access control system of an embodiment includes a UI comprising a dashboard or console for use by the enterprise administrator, as described in detail herein. The UI of an embodiment comprises a web application interface that generates and presents to the administrator a variety of interface screens or pages through which the administrator interacts with the access control system in order to configure the access control system components, monitor mobile device access, run analytics reports, establish remediation policies, respond to security alerts, and establish payment, for example. Numerous examples follow of information presented through the UI as well as example pages presented by the UI.

Figure 6:
FIG. 6 is an example of information presented by a home screen of the access control system UI, under an embodiment.

FIG. 6 is an example of information presented by a home screen of the access control system UI, under an embodiment. The information of this example includes one or more of alert information, risk information corresponding to vulnerabilities, OS updates, and device models, current device statistics, TrustScore information, security recommendations, and summary information of recent network activity.

Figure 7:
FIG. 7 is an example of information presented by an organization overview (by employee) screen of the access control system UI, under an embodiment.

FIG. 7 is an example of information presented by an organization overview (by employee) screen of the access control system UI, under an embodiment. The information of this example includes one or more of total employees of organization, employees with mobile access, total devices, employee groups, employees with no recent access, resource consumption information, and information of specific employees.

FIG. 8 is an example of information presented by an employee detail screen of the access control system UI, under an embodiment. The information of this example includes one or more of contact information, actions taken, policies affecting employee, employee device information, and access information.

FIG. 9 is an example of information presented by an organization overview (by groups) screen of the access control system UI, under an embodiment. The information of this example includes one or more of groups, employee data, group TrustScore data, policy information, and exception information.

FIG. 10 is an example of information presented by a group detail screen of the access control system UI, under an embodiment. The information of this example includes one or more of information of employees in group, Trustscore information, and policy information.

FIG. 11 is an example of information presented by a device overview screen of the access control system UI, under an embodiment. The information of this example includes one or more of model number information, active OS, total configurations, active models, and active OSs.

FIG. 12 is an example of information presented by a model detail screen of the access control system UI, under an embodiment. The information of this example includes one or more of vulnerabilities, employees, manufacturer, configuration status, policy information, exception information, configuration information, and active OS configurations.

FIG. 13 is an example of information presented by a configuration detail screen of the access control system UI, under an embodiment. The information of this example includes one or more of vulnerabilities, employees, policies, manufacturer, configuration status, and specific information of employees.

FIG. 14 is an example of information presented by an operating system (OS) detail screen of the access control system UI, under an embodiment. The information of this example includes one or more of vulnerabilities, versions, policies, exceptions, developer, models, employees, employee devices, version breakdowns, OSs, and TrustScore range.

FIG. 15 is an example of information presented by an OS version detail screen of the access control system UI, under an embodiment. The information of this example includes one or more of vulnerabilities, policies, exceptions, developer, models, employees, configurations for the OS version, and TrustScore.

FIG. 16 is an example of information presented by a vulnerability overview screen of the access control system UI, under an embodiment. The information of this example includes one or more of vulnerabilities, vulnerabilities by risk level, vulnerabilities by OS, vulnerabilities addressed by updates, vulnerabilities by type, vulnerabilities over time, active vulnerabilities, employees, affected devices, and device type.

FIG. 17 is an example of information presented by a vulnerability detail screen of the access control system UI, under an embodiment. The information of this example includes one or more of OS affected, models at risk, employees at risk, devices at risk, policies, vulnerability threat level, recommended actions, models at risk, TrustScore, employees at risk.

FIG. 18 is an example of information presented by an alert screen of the access control system UI, under an embodiment. The information of this example includes one or more of model alerts, system alerts, OS update alerts, user alerts, remediation alerts, recommended actions, and security recommendations.

FIG. 19 is an example of information presented by an alert detail screen of the access control system UI, under an embodiment. The information of this example includes one or more of alert recommendation, effect on OS TrustScore, employees affected, models affected, details, and actions.

FIG. 20 is an example of information presented by a policy screen of the access control system UI, under an embodiment. The information of this example includes one or more of TrustScore thresholds, affected devices, active policies, active exceptions, active policies, policy statements, exceptions, and affected devices.

FIG. 21 is an example of information presented by a policy detail screen of the access control system UI, under an embodiment. The information of this example includes one or more of policy statements, exceptions, devices affected, employees affected, and affected devices.

FIG. 22 is an example of information presented by an application settings screen of the access control system UI, under an embodiment. The information of this example includes one or more of settings, applications, and usage.

FIG. 23 is an example of information presented by a network settings screen of the access control system UI, under an embodiment. The information of this example includes one or more of settings, active directory employees and groups, and network information.

Figure 24:
FIG. 24 is an example of information presented by a profile settings screen of the access control system UI, under an embodiment.

FIG. 24 is an example of information presented by a profile settings screen of the access control system UI, under an embodiment. The information of this example includes one or more of settings, email address, short message service (SMS) contact information, and password.

Figure 25:
FIG. 25 is an example of information presented by an administrator settings screen of the access control system UI, under an embodiment.

FIG. 25 is an example of information presented by an administrator settings screen of the access control system UI, under an embodiment. The information of this example includes one or more of settings, administrators, alerts, policies, organization, devices, and vulnerabilities.

FIG. 26 is an example of information presented by an account settings screen of the access control system UI, under an embodiment. The information of this example includes one or more of settings, account, company profile information, and billing information.

FIG. 27 is an example of information presented by a security recommendation detail screen of the access control system UI, under an embodiment. The information of this example includes one or more of security recommendation detail, actions, reasons, effect on TrustScore of taking action, employees affected by action, models affected by action, and details.

FIG. 28 is an example of information presented by a TrustScore definition screen of the access control system UI, under an embodiment. The information of this example includes one or more of capabilities with subscore, vulnerabilities with subscore, OSs with subscore, models with subscore, and TrustScore.

FIG. 29 is an example of information presented by a support screen of the access control system UI, under an embodiment. The information of this example includes one or more of information by which a user files a support ticket, views a list of open and past support tickets with responses, and help documentation.

FIG. 30 is an example organization snapshot screen of the access control system UI, under an embodiment. The information of this example includes one or more of alerts, TrustScores, total devices, data usage, risk tracker by vulnerabilities, devices eligible for OS updates, and new models, and risk distribution by platform.

FIG. 31 is an example organization overview screen of the access control system UI, under an embodiment. The information of this example includes one or more of organization overview, employees, devices, groups, data usage, and detailed employee information.

Figure 32A:
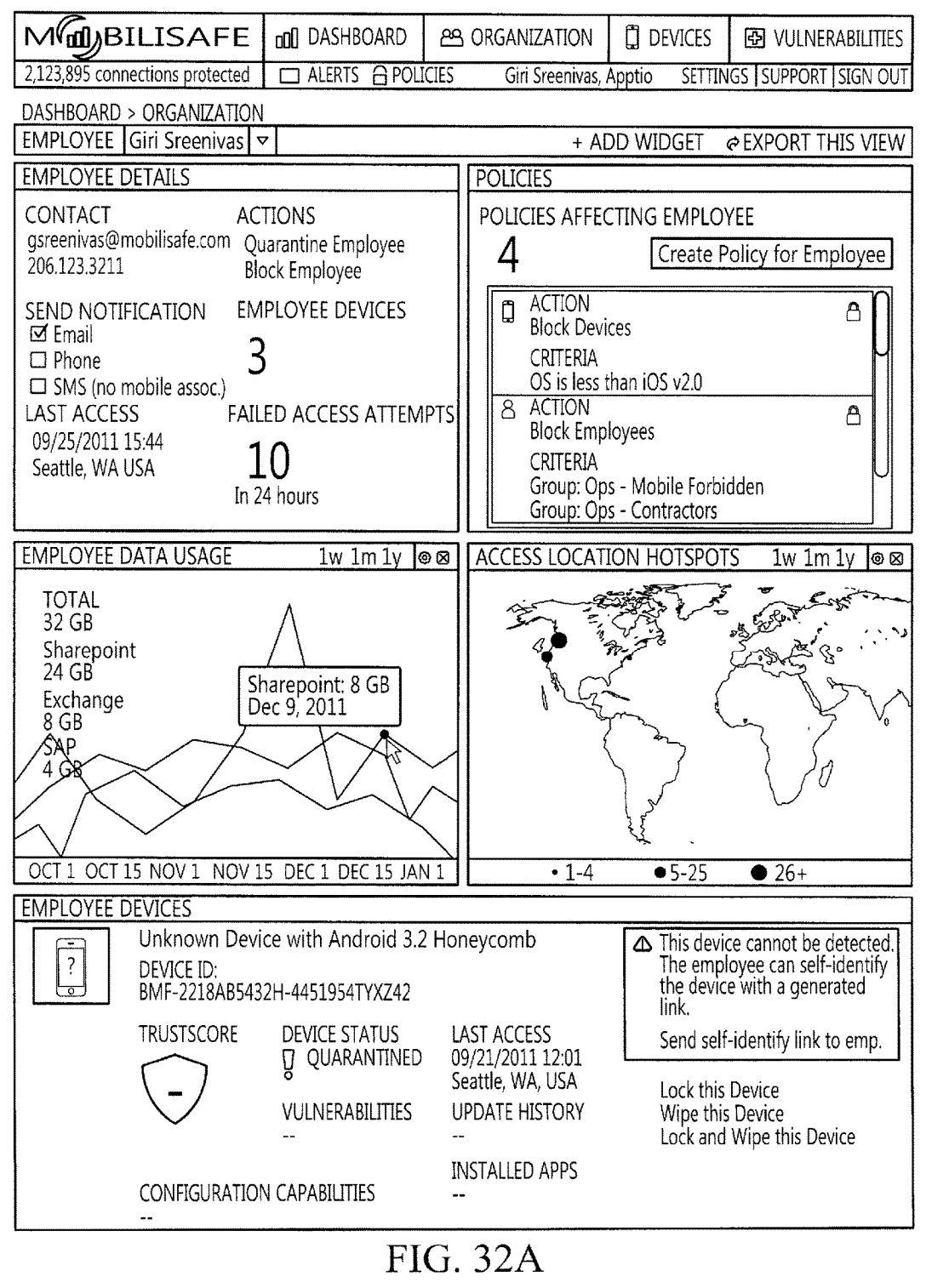

FIG. 32 is an example employee detail screen of the access control system UI, under an embodiment. The information of this example includes one or more of employee details, policies, data usage, access locations, employee devices, TrustScore, and failed access attempts.

Figure 33A:
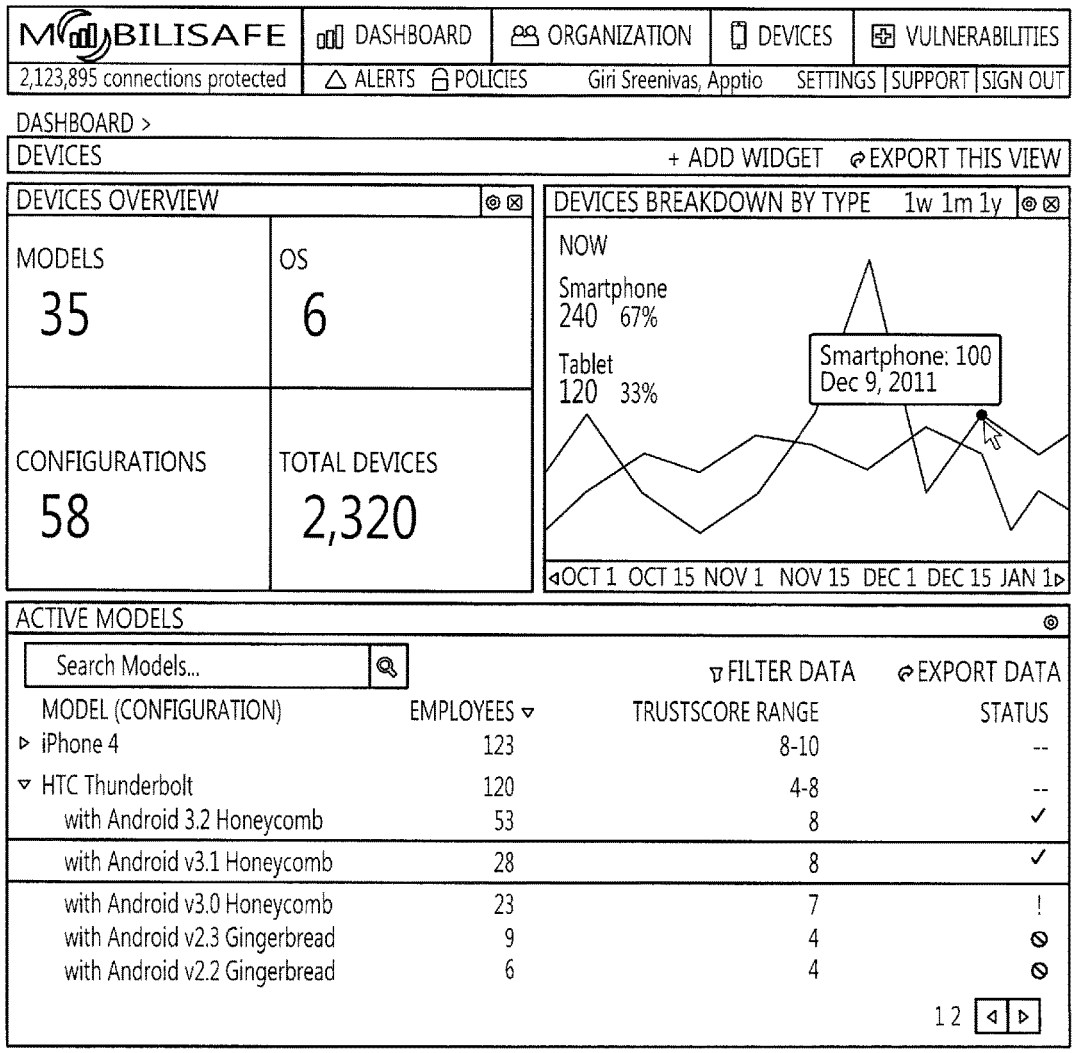
FIG. 33 is an example device information screen of the access control system UI, under an embodiment.

FIG. 33 is an example device information screen of the access control system UI, under an embodiment. The information of this example includes one or more of device overview, devices by type, active models, active operating systems, employees, vulnerabilities, and TrustScores.

FIG. 34 is an example vulnerability information screen of the access control system UI, under an embodiment. The information of this example includes one or more of vulnerabilities overview, vulnerabilities addressed by updates, vulnerabilities over time, active vulnerabilities, Trustscore, failed access attempts, and data usage.

Figure 35:
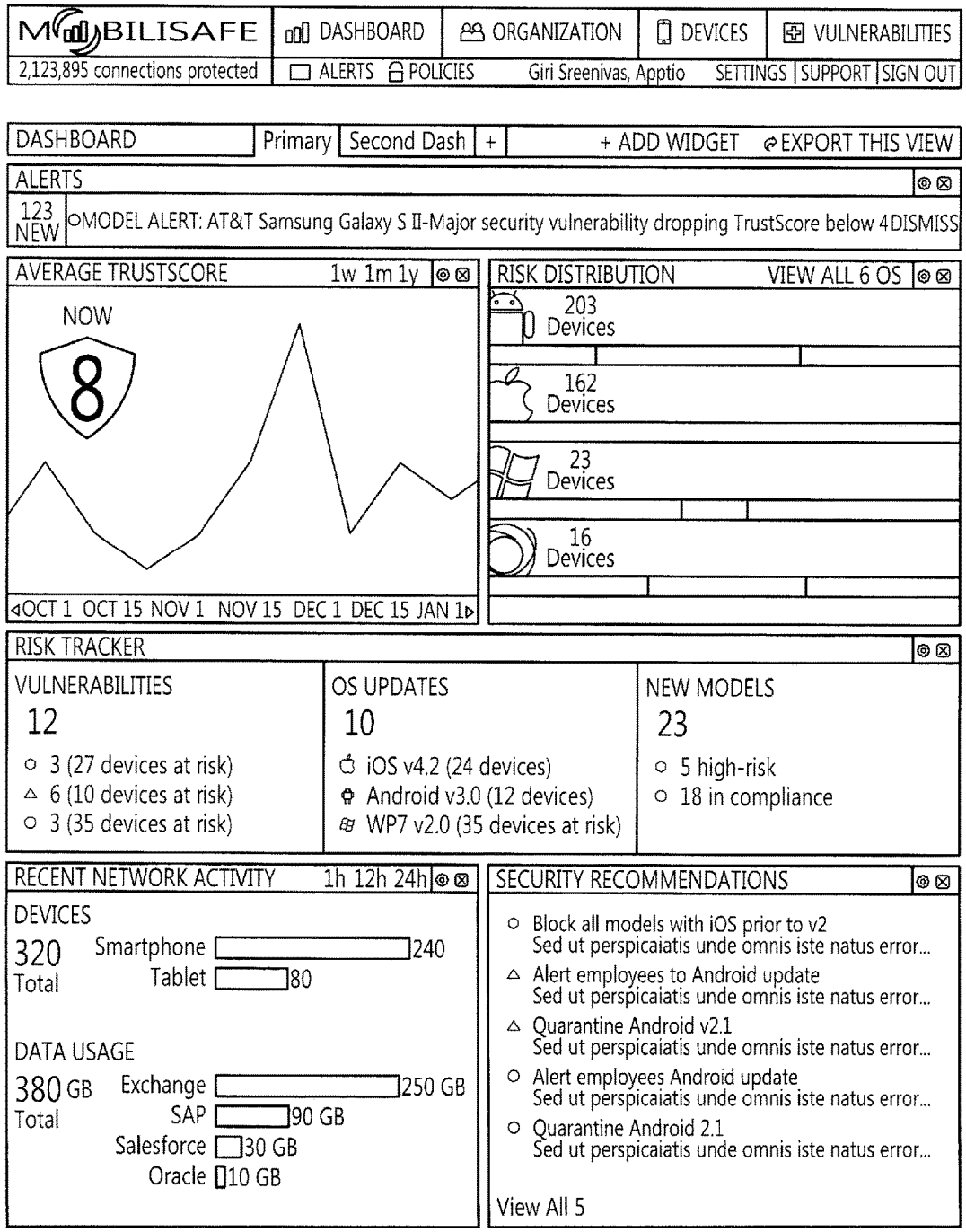
FIG. 35 is an example alert overview screen of the access control system UI, under an embodiment.

FIG. 35 is an example alert overview screen of the access control system UI, under an embodiment. The information of this example includes one or more of new alerts, TrustScore, risk distribution, risk tracker according to vulnerabilities, OS updates, and new models, recent network activity, devices, data usage, and security recommendations.

FIG. 36 is an example alert screen of the access control system UI, under an embodiment. The information of this example includes one or more of alert, severity, device, OS, version, and recommended action.

FIG. 37 is an example alert detail screen of the access control system UI, under an embodiment. The information of this example includes one or more of OS update, effect on TrustScore, devices affected, models affected, details, and recommend actions.

FIG. 38 is an example alert screen (OS update) of the access control system UI, under an embodiment. The information of this example includes one or more of OS update, recommended actions, effect on OS TrustScore, devices affected, models affected, and details.

FIG. 39 is an example policy screen of the access control system UI, under an embodiment. The information of this example includes one or more of TrustScore thresholds, devices affected, active policies, active exceptions, policies, action, criteria, devices affected, and controls to apply selection.

FIG. 40 is an example policy detail screen of the access control system UI, under an embodiment. The information of this example includes one or more of policy information, type, action, criteria, exceptions, devices affected, TrustScores, and employees affected by policy.

FIG. 41 is an example policy recommendation detail screen of the access control system UI, under an embodiment. The information of this example includes one or more of policy statement, effect on TrustScore, devices affected, models affected, details, suggested policy, and controls to apply policy.

FIG. 42 is an example policy creation screen of the access control system UI, under an embodiment. The information of this example includes one or more of an ability to select a policy type. The policy types of an embodiment include: device policies that affect devices with certain models, OS, configurations, and/or TrustScores; vulnerability policies based on vulnerability threat levels and impact; employee policies to control access for certain individuals or groups; device security policies to block access for devices that do not meet enabled security requirements.

FIG. 43 is an example device-based policy creation screen of the access control system UI, under an embodiment. The information of this example includes one or more of an ability to base a policy on an attribute (e.g., TrustScore, etc.) of the device.

Figure 44:
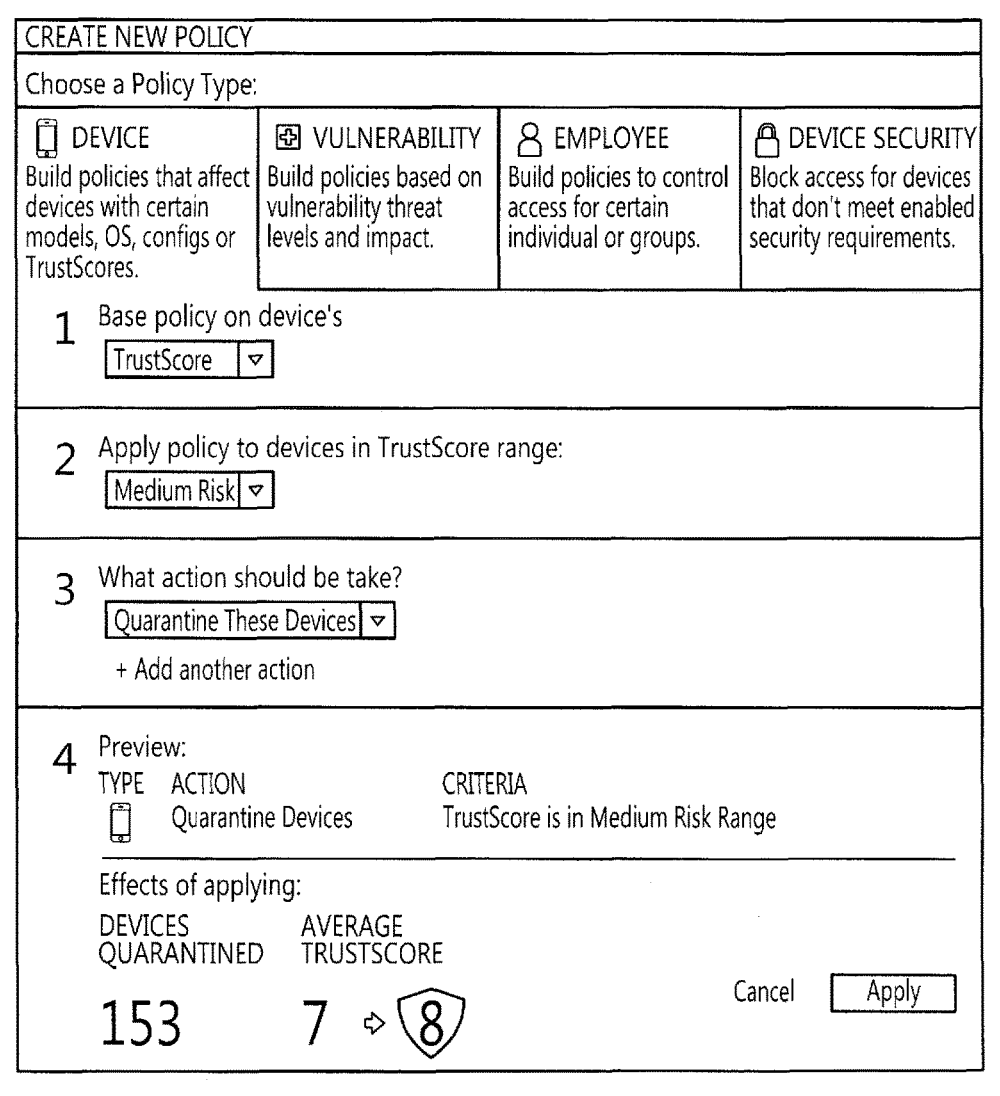

FIG. 44 is an example device TrustScore-based device policy creation screen of the access control system UI, under an embodiment. The information of this example includes one or more of an ability to apply policy to devices in a selected TrustScore range, select an action to be taken under the policy, and the effect of application of the policy on devices and TrustScore.

FIG. 45 is an example employee-based policy creation screen of the access control system UI, under an embodiment. The information of this example is directed to an employee-based policy selection, and includes one or more of individual or groups to whom the policy is to be applied, select an action to be taken under the policy, and the effect of application of the policy on employees and devices.

FIG. 46 is an example device security-based policy creation screen of the access control system UI, under an embodiment. The information of this example is directed to a device-based policy selection, and includes one or more of individual or groups to whom the policy is to be applied, enable and configure required security rules under the policy, and the effect of application of the policy on employees and devices.

Embodiments described herein include a system comprising at least one component running on at least one server. The at least one component receives vulnerability data and, for each device of a plurality of devices, device data that includes data of at least one device component. The system includes a trust score corresponding to each device of the plurality of devices and representing a level of security applied to the device. The trust score is generated using a severity of the vulnerability data. The system includes an access control component coupled to the at least one component and controlling access of the plurality of devices to an enterprise using the trust score.

Embodiments described herein include a system comprising: at least one component running on at least one server, the at least one component receiving vulnerability data and, for each device of a plurality of devices, device data that includes data of at least one device component; a trust score corresponding to each device of the plurality of devices and representing a level of security applied to the device, wherein the trust score is generated using a severity of the vulnerability data; and an access control component coupled to the at least one component and controlling access of the plurality of devices to an enterprise using the trust score.

The device data of an embodiment comprises data of at least one of device identification, configuration, operating system (OS) name, OS version, platform name, platform software components, device system image, device manufacturer, device brand, device model, device code name, user agent, central processor unit (CPU) type, and bootloader version.

The at least one component of an embodiment comprises a catalog component, wherein for each device the catalog component identifies a set of vulnerability data corresponding to the device.

The catalog component of an embodiment generates the trust score of the device using the set of vulnerability data.

The catalog component of an embodiment couples to a remote database and receives the vulnerability data from the remote database.

The catalog component of an embodiment periodically receives the vulnerability data.

The remote database of an embodiment comprises the National Vulnerabilities Database.

The catalog component of an embodiment generates a mapping between the device data and the vulnerability data.

The catalog component of an embodiment identifies the set of vulnerability data corresponding to the device using the mapping.

The catalog component of an embodiment automatically receives the device data from each of the plurality of devices.

The catalog component of an embodiment receives the device data through manual entry into the catalog.

The catalog component of an embodiment receives the device data through semi-automatic entry into the catalog.

The device of an embodiment comprises an agent application, wherein the agent application collects the device data and transfers the device data to the catalog component.

The catalog component of an embodiment receives the device data from at least one remote source, wherein the at least one remote source is remote to the at least one server and the access control component.

The catalog component of an embodiment receives supplemental device data from at least one remote source that is remote to the at least one server and the access control component, wherein the catalog component supplements the device data using the supplemental device data.

The catalog component of an embodiment receives the device data via self-identification, wherein the self-identification includes sending an electronic query to a user of a device and receiving the device data in response to action on the device resulting from the electronic query.

When the device data is deficient, the access control component of an embodiment places in a hold status a connection with a device attempting to access the enterprise.

While the connection is in the hold status, the access control component of an embodiment attempts to couple to at least one additional device data source and complete the device data using the at least one additional device data source, wherein the at least one additional device data source is remote to the at least one of the at least one server and the access control component.

The catalog component of an embodiment updates and maintains the trust score.

The catalog component of an embodiment updates the trust score in response to receiving a new version of the vulnerability data.

The catalog component of an embodiment updates the trust score in response to receiving updated device data.

The catalog component of an embodiment updates the trust score in response to receiving device data corresponding to a new device.

The access control component of an embodiment separately controls access to the enterprise by each software component of each device of the plurality of devices.

The system of an embodiment comprises a status list formed using at least one of a plurality of trust scores and the device data of the plurality of devices.

The status list of an embodiment includes the trust score for each device of the plurality of devices.

The status list of an embodiment includes type identification describing device type for at least one of a set of devices and at least one device of the plurality of devices.

The status list of an embodiment includes a status for each set of a plurality of sets of devices, wherein the plurality of devices comprise the plurality of sets of devices.

A set of devices of an embodiment comprises devices having at least one specified parameter of device data.

A set of devices of an embodiment comprises devices having at least one specified enterprise parameter.

The status of an embodiment comprises a first status that allows a set of devices corresponding to the first status access to the enterprise.

The status of an embodiment comprises a second status that denies a set of devices corresponding to the second status access to the enterprise.

The status of an embodiment comprises a third status that quarantines a set of devices corresponding to the third status during an attempt to access to the enterprise.

The access control component of an embodiment includes a traffic filter, wherein the plurality of devices couple to the traffic filter to access the enterprise.

The traffic filter of an embodiment is executing on an access server of an enterprise.

The traffic filter of an embodiment comprises a plurality of filter instances, where each filter instance corresponds to a process running on the access server.

The access server of an embodiment comprises a client access server (CAS)/internet information server (IIS).

The traffic filter of an embodiment receives the device data from a device connecting to the enterprise, wherein the device reports the device data via a user agent.

The traffic filter of an embodiment receives the device data from a device connecting to the enterprise, wherein the device receives an electronic mail and content of the electronic mail causes the device to report the device data via a user agent.

The traffic filter of an embodiment includes the trust score.

The traffic filter of an embodiment receives the trust score from the at least one component.

Control of the access by the traffic filter of an embodiment comprises comparing the trust score with data received during communication a device attempting to access the enterprise, and at least one of allows and denies access to the device based on the results of the comparison.

The at least one component of an embodiment comprises a trust component coupled to the catalog component, wherein the trust component generates a status list using at least one of the trust scores and the device data of the plurality of devices.

The status list of an embodiment corresponds to the enterprise and includes a status corresponding to each device.

The traffic filter of an embodiment includes the status list.

The traffic filter of an embodiment receives the status list from the trust component.

Control of the access by the traffic filter of an embodiment comprises comparing the status list with data received during communication a device attempting to access the enterprise, and at least one of allows and denies access to the device based on the results of the comparison.

The status of an embodiment is determined using at least one access policy of the enterprise.

The status of an embodiment is determined using at least one policy exception of the enterprise.

The status of an embodiment comprises a first status that allows a device corresponding to the first status access to the enterprise.

The status of an embodiment comprises a second status that denies a device corresponding to the second status access to the enterprise.

The status of an embodiment comprises a third status that quarantines a device corresponding to the third status during an attempt to access to the enterprise.

The traffic filter of an embodiment comprises at least one set of instructions executing under the traffic filter, wherein the at least one set of instructions is received from the at least one server.

The trust score of an embodiment comprises an indicator of a level of security applied to a device by the enterprise.

The trust score of an embodiment comprises a color-coded indicator.

The trust score of an embodiment comprises a numerical value.

The numerical value of an embodiment is in a range between and including zero (0) and ten (10).

The trust score of an embodiment is generated by selecting a base score, and reducing the base score by an amount corresponding to a severity of each vulnerability of the set of vulnerability data.

Each vulnerability of the set of vulnerability data of an embodiment is represented by a severity rating.

The trust score of an embodiment is generated by generating a score deduction for each vulnerability of the set of vulnerability data.

The trust score of an embodiment is generated by applying to the base score the score deduction corresponding to each vulnerability of the set of vulnerability data.

The base score of an embodiment is represented by a value of approximately ten (10).

A score deduction of an embodiment is generated with use of a formula, $D=(i^2 \div 6)-((2 \cdot i) \div 3)$, wherein variable D represents the score deduction, and variable i represents the severity rating of the vulnerability.

The at least one component of an embodiment generates at least one risk mitigation message corresponding to at least one device of the plurality of devices, wherein the risk mitigation message includes at least one suggested action for a user of the at least one device, wherein the at least one suggested action when taken reduces a risk associated with access to the enterprise by the at least one device.

The at least one component of an embodiment prioritizes the device data based on at least one of a type of the device data, a source of the device data, and consistency among parameters of the device data.

The access control component of an embodiment maintains the device data of at least one device of the plurality of devices attempting to access the enterprise.

The system of an embodiment comprises an interface coupled to the at least one component, wherein a user accesses and controls the at least one component via the interface.

The interface of an embodiment includes controls to establish a plurality of risk thresholds according to at least one of the trust scores and a plurality of ranges of trust scores.

The interface of an embodiment presents effectiveness data of a plurality of enterprise access policies enforced by the at least one component.

The plurality of enterprise access policies of an embodiment are based on at least one parameter, wherein the at least one parameter includes the trust score, a range of trust scores, device type, operating system data, at least one device capability, and device configuration.

The interface of an embodiment includes controls to generate the plurality of enterprise access policies, wherein the controls include a control to specify a policy type and a control to specify at least one parameter that is a basis for the policy.

The at least one component of an embodiment generates the plurality of enterprise access policies based on at least one of the vulnerability data, the device data, and the trust scores of the plurality of devices.

The interface of an embodiment includes controls to edit the plurality of enterprise access policies.

The interface of an embodiment includes controls to apply at least one of the plurality of enterprise access policies.

The interface of an embodiment includes controls to generate and apply a plurality of policy exceptions.

The interface of an embodiment presents predicted effectiveness data of at least one of a change to the plurality of enterprise access policies and at least one new enterprise access policy.

The predicted effectiveness data of an embodiment includes at least one of a type of device affected and a number of devices affected.

Embodiments described herein include a method comprising receiving vulnerability data and, for each device of a plurality of devices, device data by at least one component running on at least one. The device data includes data of at least one device component. The method includes generating a trust score corresponding to each device of the plurality of devices and representing a level of security applied to the device. The generating of the trust score includes use of a severity of the vulnerability data. The method includes controlling access of the plurality of devices to an enterprise using the trust score hosted at an access control component coupled to the at least one component.

Embodiments described herein include a method comprising: receiving vulnerability data and, for each device of a plurality of devices, device data by at least one component running on at least one, wherein the device data includes data of at least one device component; generating a trust score corresponding to each device of the plurality of devices and representing a level of security applied to the device, wherein the generating of the trust score includes use of a severity of the vulnerability data; and controlling access of the plurality of devices to an enterprise using the trust score hosted at an access control component coupled to the at least one component.

Embodiments described herein include a system comprising a catalog component running on at least one server and including vulnerability data and, for each device of a plurality of devices, device data that includes data of at least one device component. The plurality of devices corresponds to the enterprise. For each device the catalog component identifies a set of vulnerability data corresponding to the device. The catalog component generates a trust score of the device using the set of vulnerability data. The system includes a trust component running on the at least one server and coupled to the catalog component. The trust component generates a status list using at least one of the trust scores and the device data of the plurality of devices. The status list corresponds to the enterprise and includes a status corresponding to the device data of each device. Access of each device to the enterprise is controlled according to the status.

Embodiments described herein include a system comprising: a catalog component running on at least one server and including vulnerability data and, for each device of a plurality of devices, device data that includes data of at least one device component, wherein the plurality of devices correspond to the enterprise, wherein for each device the catalog component identifies a set of vulnerability data corresponding to the device, wherein the catalog component generates a trust score of the device using the set of vulnerability data; and a trust component running on the at least one server and coupled to the catalog component, wherein the trust component generates a status list using at least one of the trust scores and the device data of the plurality of devices, wherein the status list corresponds to the enterprise and includes a status corresponding to the device data of each device, wherein access of each device to the enterprise is controlled according to the status.

The status of an embodiment is determined using at least one access policy of the enterprise.

The status of an embodiment is determined using at least one policy exception of the enterprise.

The status of an embodiment comprises a first status that allows a device corresponding to the first status access to the enterprise.

The status of an embodiment comprises a second status that denies a device corresponding to the second status access to the enterprise.

The status of an embodiment comprises a third status that quarantines a device corresponding to the third status during an attempt to access to the enterprise.

The status list of an embodiment includes the trust score for each device of the plurality of devices.

The status list of an embodiment includes type identification describing device type for at least one of a set of devices and at least one device of the plurality of devices.

The status list of an embodiment includes a status for each set of a plurality of sets of devices, wherein the plurality of devices comprise the plurality of sets of devices.

A set of devices of an embodiment comprises devices having at least one specified parameter of device data.

A set of devices of an embodiment comprises devices having at least one specified enterprise parameter.

The status of an embodiment comprises a first status that allows a set of devices corresponding to the first status access to the enterprise.

The status of an embodiment comprises a second status that denies a set of devices corresponding to the second status access to the enterprise.

The status of an embodiment comprises a third status that quarantines a set of devices corresponding to the third status during an attempt to access to the enterprise.

The trust score of an embodiment comprises an indicator of a level of security applied to a device by the enterprise.

The trust score of an embodiment comprises a color-coded indicator.

The trust score of an embodiment comprises a numerical value.

The numerical value of an embodiment is in a range between and including zero (0) and ten (10).

The generating of the trust score of an embodiment comprises selecting a base score, and reducing the base score by an amount corresponding to a severity of each vulnerability of the set of vulnerability data.

Each vulnerability of the set of vulnerability data of an embodiment is represented by a severity rating.

The generating of the trust score of an embodiment comprises generating a score deduction for each vulnerability of the set of vulnerability data.

The generating of the trust score of an embodiment comprises applying to the base score the score deduction corresponding to each vulnerability of the set of vulnerability data.

The base score of an embodiment is represented by a value of approximately ten (10).

The generating of the score deduction of an embodiment comprises a formula, $D=(i^2 \div 6)-((2 \cdot i) \div 3)$, wherein variable D represents the score deduction, and variable i represents the severity rating of the vulnerability.

The catalog component of an embodiment updates and maintains the trust score.

The catalog component of an embodiment updates the trust score in response to receiving a new version of the vulnerability data.

The catalog component of an embodiment updates the trust score in response to receiving updated device data.

The catalog component of an embodiment updates the trust score in response to receiving device data corresponding to a new device.

The device data of an embodiment comprises data of at least one of device identification, configuration, operating system (OS) name, OS version, platform name, platform software components, device system image, device manufacturer, device brand, device model, device code name, user agent, central processor unit (CPU) type, and bootloader version.

The system of an embodiment comprises a traffic filter coupled to the trust component and running on an access server of an enterprise, wherein the traffic filter includes the status list, wherein the plurality of components couple to the traffic filter to access the enterprise, wherein the traffic filter controls the access using the status list.

The catalog component of an embodiment couples to a remote database and receives the vulnerability data from the remote database.

The catalog component of an embodiment periodically receives the vulnerability data.

The remote database of an embodiment comprises the National Vulnerabilities Database.

The catalog component of an embodiment generates a mapping between the device data and the vulnerability data.

The catalog component of an embodiment identifies the set of vulnerability data corresponding to the device using the mapping.

The catalog component of an embodiment automatically receives the device data from each of the plurality of devices.

The traffic filter of an embodiment receives the device data from a device connecting to the access server, wherein the device reports the device data via a user agent.

The traffic filter of an embodiment receives the device data from a device connecting to the access server, wherein the device receives an electronic mail and content of the electronic mail causes the device to report the device data via a user agent.

The device data of an embodiment is manually entered into the catalog.

The device data of an embodiment is received via semi-automatic entry into the catalog.

The device of an embodiment comprises an agent application, wherein the agent application collects the device data and transfers the device data to the catalog component.

The catalog component of an embodiment receives the device data from at least one remote source, wherein the at least one remote source is remote to the at least one server.

The catalog component of an embodiment receives supplemental device data from at least one remote source that is remote to the at least one server, wherein the catalog component supplements the device data using the supplemental device data.

The catalog component of an embodiment receives the device data via self-identification, wherein the self-identification includes sending an electronic query to a user of a device and receiving the device data in response to action on the device resulting from the electronic query.

When the device data is deficient, the access server of an embodiment places in a hold status a connection with a device attempting to access the enterprise.

While the connection is in the hold status, the access server of an embodiment attempts to couple to at least one additional device data source and complete the device data using the at least one additional device data source.

The traffic filter of an embodiment includes the status list.

The traffic filter of an embodiment receives the status list from the trust component.

The access server of an embodiment comprises a client access server (CAS)/internet information server (IIS).

The traffic filter of an embodiment comprises an Internet Server Application Programming Interface (ISAPI) filter.

The traffic filter of an embodiment comprises a plurality of filter instances, where each filter instance corresponds to a process running on the access server.

Control of the access by the traffic filter of an embodiment comprises comparing the status list with data received during communication a device attempting to access the enterprise, and at least one of allows and denies access to the device based on the results of the comparison.

The traffic filter of an embodiment comprises at least one set of instructions executing under the traffic filter, wherein the at least one set of instructions is received from the at least one server.

The trust component of an embodiment comprises at least one set of instructions executing under the trust component, wherein the at least one set of instructions is received from the at least one server.

The access server of an embodiment separately controls access to the enterprise by each software component of each device of the plurality of devices.

The at least one server of an embodiment generates at least one risk mitigation message corresponding to at least one device of the plurality of devices, wherein the risk mitigation message includes at least one suggested action for a user of the at least one device, wherein the at least one suggested action when taken reduces a risk associated with access to the enterprise by the at least one device.

The at least one server of an embodiment prioritizes the device data based on at least one of a type of the device data, a source of the device data, and consistency among parameters of the device data.

The catalog component of an embodiment maintains the device data of at least one device of the plurality of devices attempting to access the enterprise.

The system of an embodiment comprises an interface coupled to the at least one server, wherein a user accesses and controls at least one of the catalog component and the trust component via the interface.

The interface of an embodiment includes controls to establish a plurality of risk thresholds according to at least one of the trust scores and a plurality of ranges of trust scores.

The interface of an embodiment presents effectiveness data of a plurality of enterprise access policies enforced by at least one of the catalog component and the trust component.

The plurality of enterprise access policies of an embodiment are based on at least one parameter, wherein the at least one parameter includes the trust score, a range of trust scores, device type, operating system data, at least one device capability, and device configuration.

The interface of an embodiment includes controls to generate the plurality of enterprise access policies, wherein the controls include a control to specify a policy type and a control to specify at least one parameter that is a basis for the policy.

At least one of the catalog component and the trust component of an embodiment generate the plurality of enterprise access policies based on at least one of the vulnerability data, the device data, and the trust scores of the plurality of devices.

The interface of an embodiment includes controls to edit the plurality of enterprise access policies.

The interface of an embodiment includes controls to apply at least one of the plurality of enterprise access policies.

The interface of an embodiment includes controls to generate and apply a plurality of policy exceptions.

The interface of an embodiment presents predicted effectiveness data of at least one of a change to the plurality of enterprise access policies and at least one new enterprise access policy.

The predicted effectiveness dat of an embodiment a includes at least one of a type of device affected and a number of devices affected.

Embodiments described herein include a system comprising a catalog component running on at least one server and including vulnerability data and, for each device of a plurality of devices, device data that includes data of at least one device component. The plurality of devices corresponds to the enterprise. For each device the catalog component identifies a set of vulnerability data corresponding to the device. The catalog component generates a trust score of the device using the set of vulnerability data. The system includes a trust component running on the at least one server and coupled to the catalog component. The trust component generates a status list using at least one of the trust scores and the device data of the plurality of devices. The status list corresponds to the enterprise and includes a status corresponding to the device data of each device. The system includes a traffic filter coupled to the trust component and running on an access server of an enterprise. The plurality of components couple to the traffic filter to access the enterprise. The traffic filter controls the access using the status list.

Embodiments described herein include a system comprising a catalog component running on at least one server and including vulnerability data and, for each device of a plurality of devices, device data that includes data of at least one device component. The plurality of devices corresponds to the enterprise. For each device the catalog component identifies a set of vulnerability data corresponding to the device. The catalog component generates a trust score of the device using the set of vulnerability data. The system includes a trust component running on the at least one server and coupled to the catalog component. The trust component generates a status list using at least one of the trust scores and the device data of the plurality of devices. The status list corresponds to the enterprise and includes a status corresponding to the device data of each device. The system includes a traffic filter coupled to the trust component and running on an access server of an enterprise. The plurality of components couple to the traffic filter to access the enterprise. The traffic filter controls the access using the status list.

Embodiments described herein include a method comprising executing a catalog component on at least one server. The catalog component includes vulnerability data and, for each device of a plurality of devices, device data that includes data of at least one device component. The plurality of devices corresponds to the enterprise. For each device the catalog component identifies a set of vulnerability data corresponding to the device. The catalog component generates a trust score of the device using the set of vulnerability data. The method includes executing a trust component on the at least one server. The trust component is coupled to the catalog component. The trust component generates a status list using at least one of the trust scores and the device data of the plurality of devices. The status list corresponds to the enterprise and includes a status corresponding to the device data of each device. Access of each device to the enterprise is controlled according to the status.

Embodiments described herein include a method comprising: executing a catalog component on at least one server, the catalog component including vulnerability data and, for each device of a plurality of devices, device data that includes data of at least one device component, wherein the plurality of devices correspond to the enterprise, wherein for each device the catalog component identifies a set of vulnerability data corresponding to the device, wherein the catalog component generates a trust score of the device using the set of vulnerability data; and executing a trust component on the at least one server, wherein the trust component is coupled to the catalog component, wherein the trust component generates a status list using at least one of the trust scores and the device data of the plurality of devices, wherein the status list corresponds to the enterprise and includes a status corresponding to the device data of each device, wherein access of each device to the enterprise is controlled according to the status.

Embodiments described herein include a system comprising at least one component running on at least one server and receiving vulnerability data comprising a plurality of vulnerabilities of a plurality of processing components. Each vulnerability is represented by a severity rating. The at least one component identifies a set of vulnerabilities that corresponds to a device based on a set of processing components hosted on the device. The at least one component generates a severity score for each vulnerability of the set of vulnerabilities using the severity rating corresponding to the vulnerability, and generates a trust score that represents severity scores of the set of vulnerabilities.

Embodiments described herein include a system comprising: at least one component running on at least one server and receiving vulnerability data comprising a plurality of vulnerabilities of a plurality of processing components, wherein each vulnerability is represented by a severity rating; wherein the at least one component identifies a set of vulnerabilities that corresponds to a device based on a set of processing components hosted on the device; wherein the at least one component generates a severity score for each vulnerability of the set of vulnerabilities using the severity rating corresponding to the vulnerability, and generates a trust score that represents severity scores of the set of vulnerabilities.

The trust score of an embodiment comprises an indicator of a level of security applied to the device by an enterprise that corresponds to the device.

The trust score of an embodiment comprises a numerical value.

The numerical value of an embodiment is in a range between and including zero (0) and ten (10).

The generating of the trust score of an embodiment comprises selecting a base score that corresponds to a highest trust level.

The generating of the trust score of an embodiment comprises reducing the base score by an amount corresponding to a severity of each vulnerability of the set of vulnerability data.

The generating of the trust score of an embodiment comprises applying to the base score the severity score corresponding to each vulnerability of the set of vulnerability data.

The base score of an embodiment is represented by a value of approximately ten (10).

The generating of the severity score of an embodiment comprises a formula, $D=(i^2 \div 6)-((2 \cdot i) \div 3)$, wherein variable D represents the severity score, and variable i represents the severity rating of the vulnerability.

The at least one component of an embodiment updates and maintains the trust score.

The at least one component of an embodiment updates the trust score in response to receiving a new version of the vulnerability data.

The at least one component of an embodiment updates the trust score in response to receiving updated device data.

The at least one component of an embodiment updates the trust score in response to receiving device data corresponding to a new device.

The trust score of an embodiment comprises a color-coded indicator.

The at least one component of an embodiment receives device data of the device, wherein the device data represents the set of processing components.

The device data of an embodiment comprises data of at least one of device identification, configuration, operating system (OS) name, OS version, platform name, platform software components, device system image, device manufacturer, device brand, device model, device code name, user agent, central processor unit (CPU) type, and bootloader version.

The at least one component of an embodiment uses the device data to identify the set of vulnerabilities.

The at least one component of an embodiment generates the trust score using the set of vulnerabilities and the device data of the device.

The at least one component of an embodiment couples to a remote database and receives the vulnerability data from the remote database.

The at least one component of an embodiment periodically receives the vulnerability data.

The remote database of an embodiment comprises the National Vulnerabilities Database.

The at least one component of an embodiment generates a mapping between the device data and the vulnerability data and identifies the set of vulnerabilities corresponding to the device using the mapping.

The at least one component of an embodiment generates a status list using at least one of the trust score and the device data, wherein the status list corresponds to an enterprise associated with the plurality of devices and includes a status corresponding to each device, wherein access of each device to the enterprise is controlled according to the status list.

Control of the access of an embodiment comprises comparing the status list with data received from the device during a communication attempt and one of allowing and denying access to the device based on the results of the comparison.

The status of an embodiment is determined using at least one access policy of the enterprise.

The status of an embodiment is determined using at least one policy exception of the enterprise.

The status list of an embodiment includes the trust score.

The status of an embodiment comprises a first status that allows the device access to the enterprise.

The status of an embodiment comprises a second status that denies the device access to the enterprise.

The status of an embodiment comprises a third status that quarantines the device during an attempt to access the enterprise.

Control of the access of an embodiment comprises separately controlling access to the enterprise by each software component of each device of the plurality of devices.

The status list of an embodiment includes type identification describing device type of the device.

Embodiments described herein include a method comprising receiving vulnerability data comprising a plurality of vulnerabilities of a plurality of processing components. Each vulnerability is represented by a severity rating. The method includes identifying a set of vulnerabilities that corresponds to a device based on a set of processing components hosted on the device. The method includes selecting a base score corresponding to a highest trust level. The method includes generating a deduction for each vulnerability of the set of vulnerabilities using the severity rating corresponding to the vulnerability. The method includes generating a trust score by applying to the base score the deduction corresponding to each vulnerability of the set of vulnerabilities.

Embodiments described herein include a method comprising: receiving vulnerability data comprising a plurality of vulnerabilities of a plurality of processing components, wherein each vulnerability is represented by a severity rating; identifying a set of vulnerabilities that corresponds to a device based on a set of processing components hosted on the device; selecting a base score corresponding to a highest trust level; generating a deduction for each vulnerability of the set of vulnerabilities using the severity rating corresponding to the vulnerability; and generating a trust score by applying to the base score the deduction corresponding to each vulnerability of the set of vulnerabilities.

The trust score of an embodiment comprises an indicator of a level of security applied to the device by an enterprise that corresponds to the device.

The trust score of an embodiment comprises a numerical value.

The numerical value of an embodiment is in a range between and including zero (0) and ten (10).

The generating of the trust score of an embodiment comprises reducing the base score by an amount corresponding to a severity of each vulnerability of the set of vulnerability data.

The generating of the trust score of an embodiment comprises applying to the base score the severity score corresponding to each vulnerability of the set of vulnerability data.

The base score of an embodiment is represented by a value of approximately ten (10).

The generating of the deduction of an embodiment comprises a formula, $D=(i^2 \div 6)-((2 \cdot i) \div 3)$, wherein variable D represents the deduction, and variable i represents the severity rating of the vulnerability.

The method of an embodiment comprises updating and maintaining the trust score.

The method of an embodiment comprises updating the trust score in response to receiving a new version of the vulnerability data.

The method of an embodiment comprises updating the trust score in response to receiving updated device data.

The method of an embodiment comprises updating the trust score in response to receiving device data corresponding to a new device.

The trust score of an embodiment comprises a color-coded indicator.

The method of an embodiment comprises receiving device data of the device, wherein the device data represents the set of processing components.

The device data of an embodiment comprises data of at least one of device identification, configuration, operating system (OS) name, OS version, platform name, platform software components, device system image, device manufacturer, device brand, device model, device code name, user agent, central processor unit (CPU) type, and bootloader version.

The method of an embodiment comprises using the device data to identify the set of vulnerabilities.

The method of an embodiment comprises generating the trust score using the set of vulnerabilities and the device data of the device.

The method of an embodiment comprises receiving the vulnerability data from a remote database.

The method of an embodiment comprises periodically receiving the vulnerability data.

The remote database of an embodiment comprises the National Vulnerabilities Database.

The method of an embodiment comprises generating a mapping between the device data and the vulnerability data and identifying the set of vulnerabilities corresponding to the device using the mapping.

The method of an embodiment comprises generating a status list using at least one of the trust score and the device data, wherein the status list corresponds to an enterprise associated with the plurality of devices and includes a status corresponding to each device.

The method of an embodiment comprises controlling access of each device to the enterprise according to the status list.

The controlling of the access of an embodiment comprises comparing the status list with data received from the device during a communication attempt and one of allowing and denying access to the device based on the results of the comparison.

The method of an embodiment comprises determining the status using at least one access policy of the enterprise.

The method of an embodiment comprises determining the status using at least one policy exception of the enterprise.

The status list of an embodiment includes the trust score.

The status of an embodiment comprises a first status that allows the device access to the enterprise.

The status of an embodiment comprises a second status that denies the device access to the enterprise.

The status of an embodiment comprises a third status that quarantines the device during an attempt to access the enterprise.

The controlling of the access of an embodiment comprises separately controlling access to the enterprise by each software component of each device of the plurality of devices.

The status list of an embodiment includes type identification describing device type of the device.

Embodiments described herein include a system comprising at least one component running on at least one server and receiving device data for a plurality of devices and generating from the device data configuration data of processing components hosted on the device. The at least one component receives vulnerability data comprising a plurality of vulnerabilities of a plurality of processing components. The at least one component generates a mapping of the vulnerability data to the configuration data of each device. The at least one component, using the mapping, generates for each device of the plurality of devices a set of vulnerabilities from the vulnerability data.

Embodiments described herein include a system comprising: at least one component running on at least one server and receiving device data for a plurality of devices and generating from the device data configuration data of processing components hosted on the device; wherein the at least one component receives vulnerability data comprising a plurality of vulnerabilities of a plurality of processing components; wherein the at least one component generates a mapping of the vulnerability data to the configuration data of each device; and wherein the at least one component, using the mapping, generates for each device of the plurality of devices a set of vulnerabilities from the vulnerability data.

The at least one component of an embodiment automatically receives the device data from each of the plurality of devices.

The at least one component of an embodiment receives the device data from a device connecting to the access server, wherein the device reports the device data via a user agent.

The at least one component of an embodiment receives the device data from a device connecting to the access server, wherein the device receives an electronic mail and content of the electronic mail causes the device to report the device data via a user agent.

The device data of an embodiment is manually provided to the at least one component.

The device data of an embodiment is received via semi-automatic entry into the at least one component.

At least one device of the plurality of devices of an embodiment comprises an agent application that collects the device data and transfers the device data to the at least one component.

The at least one component of an embodiment receives the device data from at least one remote source, wherein the at least one remote source is remote to the at least one server.

The at least one component of an embodiment receives supplemental device data from at least one remote source that is remote to the at least one server, wherein the at least one component supplements the device data using the supplemental device data.

The at least one component of an embodiment receives the device data via self-identification, wherein the self-identification includes sending an electronic query to a user of a device and receiving the device data in response to action on the device resulting from the electronic query.

The at least one component of an embodiment couples to a remote database and receives the vulnerability data from the remote database.

The at least one component of an embodiment periodically receives the vulnerability data.

The remote database of an embodiment comprises the National Vulnerabilities Database.

Each vulnerability of the plurality of vulnerabilities of an embodiment is represented by a severity rating.

The at least one component of an embodiment generates a severity score for each vulnerability of the set of vulnerabilities using the severity rating corresponding to the vulnerability.

The at least one component of an embodiment generates a trust score that represents severity scores of the set of vulnerabilities.

The trust score of an embodiment comprises an indicator of a level of security applied to the device by an enterprise that corresponds to the device.

The trust score of an embodiment comprises a numerical value.

The numerical value of an embodiment is in a range between and including zero (0) and ten (10).

The generating of the trust score of an embodiment comprises selecting a base score that corresponds to a highest trust level.

The generating of the trust score of an embodiment comprises reducing the base score by an amount corresponding to a severity of each vulnerability of the set of vulnerabilities.

The generating of the trust score of an embodiment comprises applying to the base score the severity score corresponding to each vulnerability of the set of vulnerabilities.

The base score of an embodiment is represented by a value of approximately ten (10).

The generating of the severity score of an embodiment comprises a formula, $D=(i^2 \div 6)-((2 \cdot i) \div 3)$, wherein variable D represents the severity score, and variable i represents the severity rating of the vulnerability.

The at least one component of an embodiment updates and maintains the trust score.

The at least one component of an embodiment updates the trust score in response to receiving a new version of the vulnerability data.

The at least one component of an embodiment updates the trust score in response to receiving updated device data.

The at least one component of an embodiment updates the trust score in response to receiving device data corresponding to a new device.

The device data of an embodiment represents the processing components hosted on a corresponding device.

The device data of an embodiment comprises data of at least one of device identification, configuration, operating system (OS) name, OS version, platform name, platform software components, device system image, device manufacturer, device brand, device model, device code name, user agent, central processor unit (CPU) type, and bootloader version.

The at least one component of an embodiment uses the device data to identify the set of vulnerabilities.

The at least one component of an embodiment generates the trust score using the set of vulnerabilities and the device data of the device.

The at least one component of an embodiment generates a status list using at least one of the trust score and the device data, wherein the status list corresponds to an enterprise associated with the plurality of devices and includes a status corresponding to each device, wherein access of each device to the enterprise is controlled according to the status list.

Control of the access of an embodiment comprises comparing the status list with data received from the device during a communication attempt and one of allowing and denying access to the device based on the results of the comparison.

The status of an embodiment is determined using at least one access policy of the enterprise.

The status of an embodiment is determined using at least one policy exception of the enterprise.

The status list of an embodiment includes the trust score.

The status of an embodiment comprises a first status that allows the device access to the enterprise.

The status of an embodiment comprises a second status that denies the device access to the enterprise.

The status of an embodiment comprises a third status that quarantines the device during an attempt to access the enterprise.

The status list of an embodiment includes type identification describing device type of the device.

The at least one component of an embodiment comprises a traffic filter that includes the status list, wherein the traffic filter is hosted on an access server of the enterprise, wherein the plurality of devices couple to the traffic filter to access the enterprise and the traffic filter controls the access using the status list.

When the device data of an embodiment is deficient, the access server places in a hold status a connection with a device attempting to access the enterprise.

While the connection is in the hold status, the at least one component of an embodiment attempts to couple to at least one additional device data source and complete the device data using the at least one additional device data source.

The traffic filter of an embodiment comprises at least one set of instructions executing under the traffic filter, wherein the at least one set of instructions is received from the at least one server.

The access server of an embodiment separately controls access to the enterprise by each software component of each device of the plurality of devices.

The at least one component of an embodiment maintains the device data of at least one device of the plurality of devices attempting to access the enterprise.

The at least one server of an embodiment generates at least one risk mitigation message corresponding to at least one device of the plurality of devices, wherein the risk mitigation message includes at least one suggested action for a user of the at least one device, wherein the at least one suggested action when taken reduces a risk associated with access to the enterprise by the at least one device.

The at least one server of an embodiment prioritizes the device data based on at least one of a type of the device data, a source of the device data, and consistency among parameters of the device data.

Embodiments described herein include a method comprising receiving device data for a plurality of devices. The method includes generating from the device data configuration data of processing components hosted on the device. The method includes receiving vulnerability data comprising a plurality of vulnerabilities of a plurality of processing components. The method includes generating a mapping of the vulnerability data to the device data. The method includes generating a set of vulnerabilities that corresponds to each device of the plurality of devices using the mapping.

Embodiments described herein include a method comprising: receiving device data for a plurality of devices; generating from the device data configuration data of processing components hosted on the device; receiving vulnerability data comprising a plurality of vulnerabilities of a plurality of processing components; generating a mapping of the vulnerability data to the device data; and generating a set of vulnerabilities that corresponds to each device of the plurality of devices using the mapping.

In the description above, numerous specific details are introduced to provide a thorough understanding of, and enabling description for, embodiments of the access control system. One skilled in the relevant art, however, will recognize that these embodiments can be practiced without one or more of the specific details, or with other components, systems, etc. In other instances, well known structures or operations are not shown, or are not described in detail, to avoid obscuring aspects of the disclosed embodiments.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the access control system is not intended to be exhaustive or to limit the systems and methods described to the precise form disclosed. While specific embodiments of, and examples for, the access control system are described herein for illustrative purposes, various equivalent modifications are possible within the scope of other systems and methods, as those skilled in the relevant art will recognize. The teachings of the access control system provided herein can be applied to other processing systems and methods, not only for the systems and methods described above.

The elements and acts of the various embodiments described above can be combined to provide further embodiments. These and other changes can be made to the access control system in light of the above detailed description.

In general, in the following claims, the terms used should not be construed to limit the embodiments described above to the specific embodiments disclosed in the specification and the claims, but should be construed to include all systems that operate under the claims. Accordingly, the embodiments described above are not limited by the disclosure, but instead the scope is to be determined entirely by the claims.

While certain aspects of the embodiments described above are presented below in certain claim forms, the inventors contemplate the various aspects of the embodiments described above in any number of claim forms. Accordingly, the inventors reserve the right to add additional claims after filing the application to pursue such additional claim forms for other aspects of the embodiments described above.

What is claimed is:

1. A system comprising:
   a processor; and
   a non-transitory computer readable storage medium coupled to the processor and storing program instructions configured to:
   execute, on at least one server, a catalog component that configures the at least one server to include vulnerability data and, for each device of a plurality of devices, device data that includes data of at least one device component, wherein
      for each device, the catalog component configures the at least one server to identify a set of vulnerability data corresponding to the device,
      the catalog component configures the at least one server to generate a trust score of the device by calculating for each vulnerability of the set of vulnerability data a vulnerability trust score that is proportional to a severity rating of each vulnerability, and to calculate the trust score by combining the vulnerability trust score of each vulnerability,
      the at least one server executes a trust component in communication with the catalog component,
      the trust component configures the at least one server to generate a status list using at least one of the trust scores and the device data of the plurality of devices,
      the status list corresponds to an enterprise and includes a status corresponding to the device data of each device, and
      access of each device to the enterprise is controlled according to the status.

2. The system of claim 1, wherein the status is determined using at least one access policy of the enterprise.

3. The system of claim 1, wherein the status is determined using at least one policy exception of the enterprise.

4. The system of claim 1, wherein the status comprises a first status that allows a device corresponding to the first status access to the enterprise.

5. The system of claim 1, wherein the status comprises a second status that denies a device corresponding to the second status access to the enterprise.

6. The system of claim 1, wherein the status comprises a third status that quarantines a device corresponding to the third status during an attempt to access to the enterprise.

7. The system of claim 1, wherein the status list includes the trust score for each device of the plurality of devices.

8. The system of claim 1, wherein the status list includes type identification describing device type for at least one of a set of devices and at least one device of the plurality of devices.

9. The system of claim 1, wherein the status list includes a status for each set of a plurality of sets of devices, wherein the plurality of devices comprise the plurality of sets of devices.

10. The system of claim 9, where a set of devices comprises devices having at least one specified parameter of device data.

11. The system of claim 9, where a set of devices comprises devices having at least one specified enterprise parameter.

12. The system of claim 9, wherein the status comprises a first status that allows a set of devices corresponding to the first status access to the enterprise.

13. The system of claim 9, wherein the status comprises a second status that denies a set of devices corresponding to the second status access to the enterprise.

14. The system of claim 9, wherein the status comprises a third status that quarantines a set of devices corresponding to the third status during an attempt to access to the enterprise.

15. The system of claim 1, wherein the trust score comprises an indicator of a level of security applied to a device by the enterprise.

16. The system of claim 1, wherein the trust score comprises a color-coded indicator.

17. The system of claim 1, wherein the trust score comprises a numerical value.

18. The system of claim 17, wherein the numerical value is in a range between and including zero (0) and ten (10).

19. The system of claim 17, wherein the generating of the trust score comprises selecting a base score, and reducing the base score by an amount corresponding to a severity of each vulnerability of the set of vulnerability data.

20. The system of claim 17, wherein each vulnerability of the set of vulnerability data is represented by a severity rating.

21. The system of claim 20, wherein the generating of the trust score comprises generating a score deduction for each vulnerability of the set of vulnerability data.

22. The system of claim 21, wherein the generating of the trust score comprises applying to the base score the score deduction corresponding to each vulnerability of the set of vulnerability data.

23. The system of claim 22, wherein the base score is represented by a value of approximately ten (10).

24. The system of claim 23, wherein the generating of the score deduction comprises a formula $D=(i27\ 6)-((2 \cdot i)7\ 3)$, wherein variable D represents the score deduction, and variable i represents the severity rating of the vulnerability.

25. The system of claim 1, wherein the catalog component updates and maintains the trust score.

26. The system of claim 25, wherein the catalog component updates the trust score in response to receiving a new version of the vulnerability data.

27. The system of claim 25, wherein the catalog component updates the trust score in response to receiving updated device data.

28. The system of claim 25, wherein the catalog component updates the trust score in response to receiving device data corresponding to a new device.

29. The system of claim 1, wherein the device data comprises data of at least one of device identification, configuration, operating system (OS) name, OS version, platform name, platform software components, device system image, device manufacturer, device brand, device model, device code name, user agent, central processor unit (CPU) type, and bootloader version.

30. The system of claim 1, comprising a traffic filter coupled to the trust component and running on an access server of an enterprise, wherein the traffic filter includes the status list, wherein the plurality of components couple to the traffic filter to access the enterprise, wherein the traffic filter controls the access using the status list.

31. The system of claim 30, wherein the catalog component couples to a remote database and receives the vulnerability data from the remote database.

32. The system of claim 31, wherein the catalog component periodically receives the vulnerability data.

33. The system of claim 31, wherein the remote database comprises the National Vulnerabilities Database.

34. The system of claim 30, wherein the catalog component generates a mapping between the device data and the vulnerability data.

35. The system of claim 34, wherein the catalog component identifies the set of vulnerability data corresponding to the device using the mapping.

36. The system of claim 30, wherein the catalog component automatically receives the device data from each of the plurality of devices.

37. The system of claim 36, wherein the traffic filter receives the device data from a device connecting to the access server, wherein the device reports the device data via a user agent.

38. The system of claim 36, wherein the traffic filter receives the device data from a device connecting to the access server, wherein the device receives an electronic mail and content of the electronic mail causes the device to report the device data via a user agent.

39. The system of claim 30, wherein the device data is manually entered into the catalog.

40. The system of claim 30, wherein the device data is received via semi-automatic entry into the catalog.

41. The system of claim 40, wherein the device comprises an agent application, wherein the agent application collects the device data and transfers the device data to the catalog component.

42. The system of claim 30, wherein the catalog component receives the device data from at least one remote source, wherein the at least one remote source is remote to the at least one server.

43. The system of claim 30, wherein the catalog component receives supplemental device data from at least one remote source that is remote to the at least one server, wherein the catalog component supplements the device data using the supplemental device data.

44. The system of claim 30, wherein the catalog component receives the device data via self-identification, wherein the self-identification includes sending an electronic query to a user of a device and receiving the device data in response to action on the device resulting from the electronic query.

45. The system of claim 30, wherein, when the device data is deficient, the access server places in a hold status a connection with a device attempting to access the enterprise.

46. The system of claim 45, wherein, while the connection is in the hold status, the access server attempts to couple to at least one additional device data source and complete the device data using the at least one additional device data source.

47. The system of claim 30, wherein the traffic filter includes the status list.

48. The system of claim 30, wherein the traffic filter receives the status list from the trust component.

49. The system of claim 30, wherein the access server comprises a client access server (CAS)/internet information server (HS).

50. The system of claim 30, wherein the traffic filter comprises an Internet Server Application Programming Interface (ISAPI) filter.

51. The system of claim 30, wherein the traffic filter comprises a plurality of filter instances, where each filter instance corresponds to a process running on the access server.

52. The system of claim 30, wherein control of the access by the traffic filter comprises comparing the status list with data received during communication a device attempting to access the enterprise, and at least one of allows and denies access to the device based on the results of the comparison.

53. The system of claim 30, wherein the traffic filter comprises at least one set of instructions executing under the traffic filter, wherein the at least one set of instructions is received from the at least one server.

54. The system of claim 30, wherein the trust component comprises at least one set of instructions executing under the trust component, wherein the at least one set of instructions is received from the at least one server.

55. The system of claim 30, wherein the access server separately controls access to the enterprise by each software component of each device of the plurality of devices.

56. The system of claim 1, wherein the at least one server generates at least one risk mitigation message corresponding to at least one device of the plurality of devices, wherein the risk mitigation message includes at least one suggested action for a user of the at least one device, wherein the at least one suggested action when taken reduces a risk associated with access to the enterprise by the at least one device.

57. The system of claim 1, wherein the at least one server prioritizes the device data based on at least one of a type of the device data, a source of the device data, and consistency among parameters of the device data.

58. The system of claim 1, wherein the catalog component maintains the device data of at least one device of the plurality of devices attempting to access the enterprise.

59. The system of claim 1, comprising an interface coupled to the at least one server, wherein a user accesses and controls at least one of the catalog component and the trust component via the interface.

60. The system of claim 59, wherein the interface includes controls to establish a plurality of risk thresholds according to at least one of the trust scores and a plurality of ranges of trust scores.

61. The system of claim 59, wherein the interface presents effectiveness data of a plurality of enterprise access policies enforced by at least one of the catalog component and the trust component.

62. The system of claim 61, wherein the plurality of enterprise access policies are based on at least one parameter, wherein the at least one parameter includes the trust score, a range of trust scores, device type, operating system data, at least one device capability, and device configuration.

63. The system of claim 61, wherein the interface includes controls to generate the plurality of enterprise access policies, wherein the controls include a control to specify a policy type and a control to specify at least one parameter that is a basis for the policy.

64. The system of claim 61, wherein at least one of the catalog component and the trust component generate the plurality of enterprise access policies based on at least one of the vulnerability data, the device data, and the trust scores of the plurality of devices.

65. The system of claim 64, wherein the interface includes controls to edit the plurality of enterprise access policies.

66. The system of claim 64, wherein the interface Includes controls to apply at least one of the plurality of enterprise access policies.

67. The system of claim 61, wherein the interface includes controls to generate and apply a plurality of policy exceptions.

68. The system of claim 61, wherein the interface presents predicted effectiveness data of at least one of a change to the plurality of enterprise access policies and at least one new enterprise access policy.

69. The system of claim 68, wherein the predicted effectiveness data includes at least one of a type of device affected and a number of devices affected.

70. A system comprising:
a processor; and
a non-transitory computer readable storage medium coupled to the processor and storing program instructions configured to:
execute, on at least one server, a catalog component that configures the at least one server to include vulnerability data and, for each device of a plurality of devices, device data that includes data of at least one device component, wherein for each device the catalog component configures the at least one server to identify a set of vulnerability data corresponding to the device, wherein the catalog component configures the at least one server to generate a trust score of the device by calculating for each vulnerability of the set of vulnerability data a vulnerability trust score that is proportional to a severity rating of each vulnerability, and to calculate the trust score by combining the vulnerability trust score of each vulnerability;
wherein the at least one server is executing a trust component in communication with the catalog component, wherein the trust component configures the at least one server to generate a status list using at least one of the trust scores and the device data of the plurality of devices, Wherein the status list corresponds to the enterprise and includes a status corresponding to the device data of each device; and
execute, on an access server of an enterprise, a traffic filter, wherein the traffic filter is coupled to the trust component and running on an access server of the enterprise, wherein the plurality of components couple to the traffic filter to access the enterprise, wherein the traffic filter controls the access using the status list.

71. A computer-implemented method comprising:
executing a catalog component on at least one server, the catalog component including vulnerability data and, for each device of a plurality of devices, device data that includes data of at least one device component, wherein the plurality of devices correspond to the enterprise, wherein for each device the catalog component identifies a set of vulnerability data corresponding to the device, wherein the catalog component generates a trust score of the device by calculating for each vulnerability of the set of vulnerability data a vulnerability trust score that is proportional to a severity rating of each vulnerability, and calculating the trust score by combining the vulnerability trust score of each vulnerability; and
executing a trust component on the at least one server, wherein the trust component is coupled to the catalog component, wherein the trust component generates a status list using at least one of the trust scores and the device data of the plurality of devices, wherein the status list corresponds to the enterprise and includes a status corresponding to the device data of each device, wherein access of each device to the enterprise is controlled according to the status.

* * * * *